US012442526B2

(12) United States Patent
Kubsad et al.

(10) Patent No.: US 12,442,526 B2
(45) Date of Patent: Oct. 14, 2025

(54) LIGHT-EMITTING DIODE LUMINAIRE ASSEMBLY

(71) Applicant: Eaton Intelligent Power Limited, Dublin (IE)

(72) Inventors: Vinaya Nandish Kubsad, Pune (IN); Gangadhar Mestri, Pune (IN); Mudasser Uddin Qureshi, Pune (IN); Shriprasad Vinod Khadse, Pune (IN); Mukesh Gupta, Pune (IN); Manoj Kumar Verma, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/537,614

(22) Filed: Dec. 12, 2023

(65) Prior Publication Data

US 2025/0189116 A1 Jun. 12, 2025

(51) Int. Cl.

*F21V 29/77* (2015.01)
*F21K 9/90* (2016.01)
(Continued)

(52) U.S. Cl.

CPC .............. *F21V 29/773* (2015.01); *F21K 9/90* (2013.01); *F21V 17/06* (2013.01); *F21V 21/40* (2013.01); *F21V 23/009* (2013.01); *F21V 23/045* (2013.01); *F21V 23/0471* (2013.01); *F21V 29/503* (2015.01); *F21V 29/508* (2015.01);
(Continued)

(58) Field of Classification Search

CPC .... F21V 29/773; F21V 29/009; F21V 29/045; F21V 29/047; F21V 17/06; F21V 21/40; F21K 9/90

See application file for complete search history.

(56) References Cited

U.S. PATENT DOCUMENTS

| | | | |
|---|---|---|---|
| 11,092,296 | B2 | 8/2021 | Cattoni |
| 2011/0141728 | A1 | 6/2011 | Russello |

(Continued)

FOREIGN PATENT DOCUMENTS

| | | | |
|---|---|---|---|
| CN | 204693082 U | 10/2015 | |
| CN | 110159952 A | 8/2019 | |
| WO | WO 2014030862 A1 | 2/2014 | |

OTHER PUBLICATIONS

U.S. Appl. No. 29/920,714, filed Dec. 12, 2023, Kubsad.
International search report and Written Opinion received for PCT Application No. PCT/IB2024/062462, 22 pages.

*Primary Examiner* — Elmito Breval
*Assistant Examiner* — Michael Chiang
(74) *Attorney, Agent, or Firm* — Baker Botts L.L.P.

(57) ABSTRACT

A light-emitting diode (LED) luminaire assembly is provided, which includes an integrated housing having a mounting plate mounted horizontally within the integrated housing and divides the integrated housing into an upper and lower internal cavity. A driver is mounted to the mounting plate within the upper internal cavity and configured to provide electricity to an LED assembly. The integrated housing also includes multiple fins extending radially outward from the integrated housing. Heat from the driver is dissipated through the mounting plate and fins. A driver cover is coupled to the integrated housing to form the upper internal cavity. The LED assembly is coupled to the integrated housing to form the lower internal cavity.

19 Claims, 16 Drawing Sheets

(51) Int. Cl.

| | |
|---|---|
| ***F21V 17/06*** | (2006.01) |
| ***F21V 21/40*** | (2006.01) |
| ***F21V 23/00*** | (2015.01) |
| ***F21V 23/04*** | (2006.01) |
| ***F21V 29/503*** | (2015.01) |
| ***F21V 29/508*** | (2015.01) |
| *F21Y 105/18* | (2016.01) |
| *F21Y 115/10* | (2016.01) |

(52) U.S. Cl.
CPC ....... *F21Y 2105/18* (2016.08); *F21Y 2115/10* (2016.08)

(56) References Cited

U.S. PATENT DOCUMENTS

| | | | | |
|---|---|---|---|---|
| 2011/0242828 | A1* | 10/2011 | Blincoe | F21V 23/008 362/373 |
| 2013/0201697 | A1 | 8/2013 | Osada | |
| 2014/0313727 | A1* | 10/2014 | Dupre | F21S 8/036 362/368 |
| 2015/0003071 | A1* | 1/2015 | Gui | F21V 19/005 362/373 |
| 2016/0245464 | A1 | 8/2016 | Kim | |
| 2018/0003370 | A1 | 1/2018 | Mandlekar | |
| 2018/0160509 | A1* | 6/2018 | Treible, Jr. | F21V 15/01 |
| 2021/0204379 | A1* | 7/2021 | Zhang | H05B 47/105 |
| 2022/0082233 | A1* | 3/2022 | Kopitzke | F21V 23/004 |
| 2022/0113007 | A1* | 4/2022 | Chavan | F21V 29/10 |
| 2022/0154898 | A1* | 5/2022 | Lokhande | F21S 9/02 |

* cited by examiner

LIGHT-EMITTING DIODE LUMINAIRE ASSEMBLY

TECHNICAL FIELD

This disclosure relates generally to a luminaire assembly, and more particularly to an integrated housing of a high-lumen light-emitting diode (LED) luminaire assembly located in a harsh and hazardous environment.

BACKGROUND

Lighting features designed for use in harsh and hazardous environments often require a specific focus on heat management in the operation of the lighting fixtures. Such lighting fixtures may include many high-output LEDs operating in combination and can produce excessively high temperatures, for example, for hazardous location usage where ambient temperature is already relatively high. The peak operating temperatures of the lighting components must be managed to prevent system malfunction or damage. Moreover, the lighting assembly must be resistant to dust, humidity, vapors, gas, or other corrosive or non-corrosive substances present in the ambient environment to provide reliable operation, longevity of the physical components, and safety. To meet these operational requirements, conventional LED luminaire assemblies typically employ lighting housings that are bulky, heavy, and difficult and expensive to manufacture in order for the luminaire assemblies to safely and reliably operate in a harsh and hazardous environment. Further, bulky and heavy assemblies may be difficult to carry, install, replace, and perform maintenance on. There is a need for lighting features that are simultaneously rated for operation in such environments while being lightweight, durable, less expensive to manufacture, and aesthetically pleasing.

SUMMARY OF PARTICULAR EMBODIMENTS

This disclosure presents a compact and light luminaire lighting assembly for harsh and hazardous environments as well as other industrial and commercial spaces. A new integrated housing is designed that accommodates LED elements, circuit boards, drivers, and other electronic and electric components and is optimized for better thermal performance for higher ambient temperatures. For example, the single housing may accommodate LEDs and electronic boards on one side and drivers and other electrical and electronic components on the other side separated by a conducting mounting plate. This advantageously reduces the packaging size and weight of the product, making the luminaire assembly more cost-effective for manufacturing as less material is required and more desirable for confined installation sites, and provides better thermal flow path and heat dissipation. The assembly according to this disclosure also provides the added benefits of case of mounting, cleaning, servicing, and handling through a combination of features disclosed herein.

In one embodiment, a light-emitting diode (LED) luminaire assembly is provided, which comprises an integrated housing having a mounting plate mounted horizontally within the integrated housing and divides the integrated housing into an upper and lower internal cavity. A driver is mounted to the mounting plate within the upper internal cavity and configured to provide electricity to an LED assembly. The integrated housing also includes multiple fins extending radially outward from the integrated housing.

Heat from the driver is dissipated through the mounting plate and fins. A driver cover is coupled to the integrated housing to form the upper internal cavity. The LED assembly is coupled to the integrated housing to form the lower internal cavity.

In particular embodiments, the integrated housing further comprises a handle. In particular embodiments, the handle extends from two or more fins of the plurality of fins. In particular embodiments, two or more of the plurality of fins are separated from one another by a through spacing. In particular embodiments, two or more of the plurality of fins are separated from one another by a leg spacing to provide an anti-rollover feature. The separation of the fins in the leg spacing is greater than the separation of the fins in the through spacing. In particular embodiments, the integrated housing comprises two anti-rollover features that are positioned 90 degrees apart from each other. In particular embodiments, the mounting plate is made of heat-conducting material. In particular embodiments, the mounting plate has a rim configured with a plurality of cut-outs. In particular embodiments, the driver cover is coupled to the integrated housing via a hinge. In particular embodiments, a maximum opening angle of the driver cover relative to the integrated housing is 128 degrees. In particular embodiments, heat from the LED assembly is dissipated through the plurality of fins. In particular embodiments, the integrated housing further comprises an occupancy sensor. In particular embodiments, the luminaire assembly further comprises one or more Internet of the Things (IoT) boards mounted within the lower internal cavity of the integrated housing. In particular embodiments, an inner surface of the integrated housing comprises a step for coupling the mounting plate to the integrated housing.

In one embodiment, an integrated housing for use with a light-emitting diode (LED) luminaire assembly is provided, which comprises a mounting plate mounted horizontally within the integrated housing and divides the integrated housing into an upper and lower internal cavity, a driver configured to provide electricity to an LED assembly and mounted to the mounting plate within the upper internal cavity, and a plurality of fins extending radially outward from the integrated housing. Heat from the driver is dissipated through the mounting plate and the plurality of fins.

In particular embodiments, the integrated housing further comprises a handle. In particular embodiments, the handle extends from two or more fins of the plurality of fins. In particular embodiments, two or more of the plurality of fins are separated from one another by a through spacing. In particular embodiments, two or more of the plurality of fins are separated from one another by a leg spacing to provide an anti-rollover feature. The separation of the fins in the leg spacing is greater than the separation of the fins in the through spacing.

In one embodiment, a method of manufacturing a light-emitting diode (LED) luminaire assembly is provided, which comprises: providing an integrated housing, the integrated housing comprising a plurality of fins extending radially outward from the integrated housing; coupling a mounting plate horizontally within the integrated housing such that the mounting plate divides the integrated housing into an upper and lower internal cavity; mounting a driver to the mounting plate within the upper internal cavity, the driver being configured to provide electricity to an LED assembly, wherein heat from the driver is dissipated through the mounting plate and the plurality of fins during operation; coupling a driver cover to the integrated housing to form the upper internal cavity; and coupling the LED assembly to the integrated housing to form the lower internal cavity.

BRIEF DESCRIPTION OF THE DRAWINGS

Embodiments in accordance with this disclosure will now be described by reference to the accompanying drawings, in which.

DESCRIPTION OF EXAMPLE EMBODIMENTS

Figure 1:
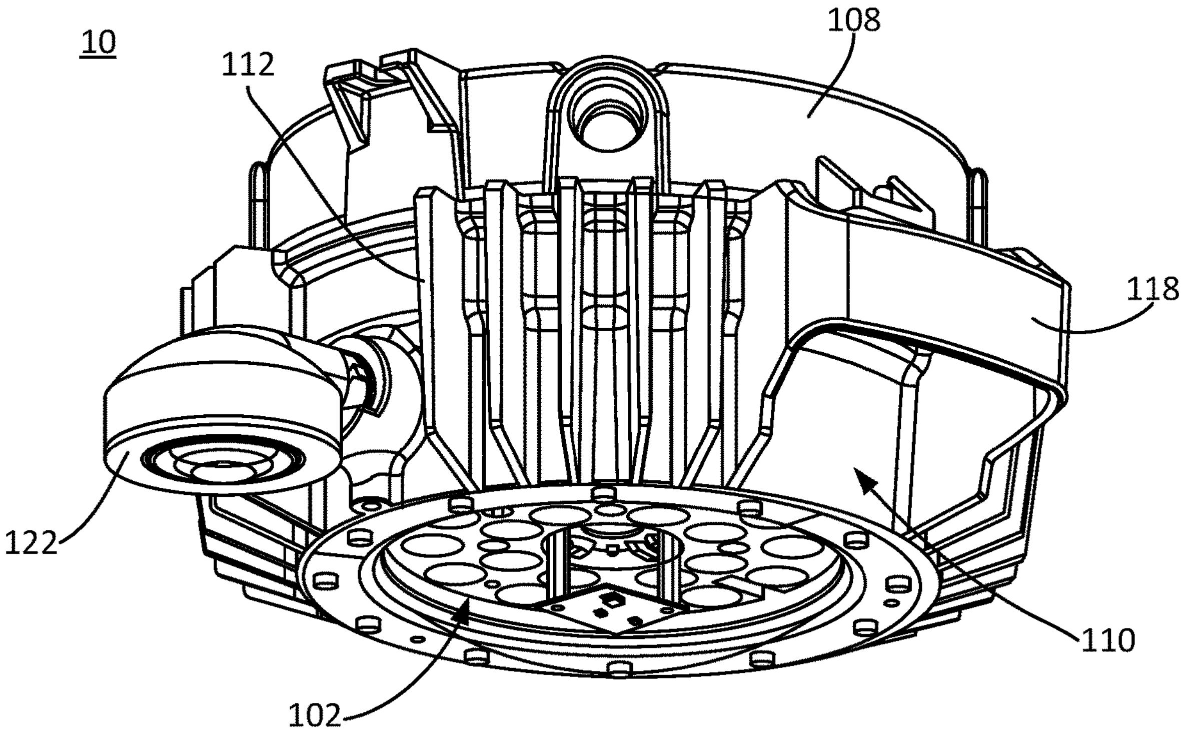
FIGS. 1-5 illustrate multiple perspective views of an embodiment of a luminaire assembly according to this disclosure.
Figure 2:
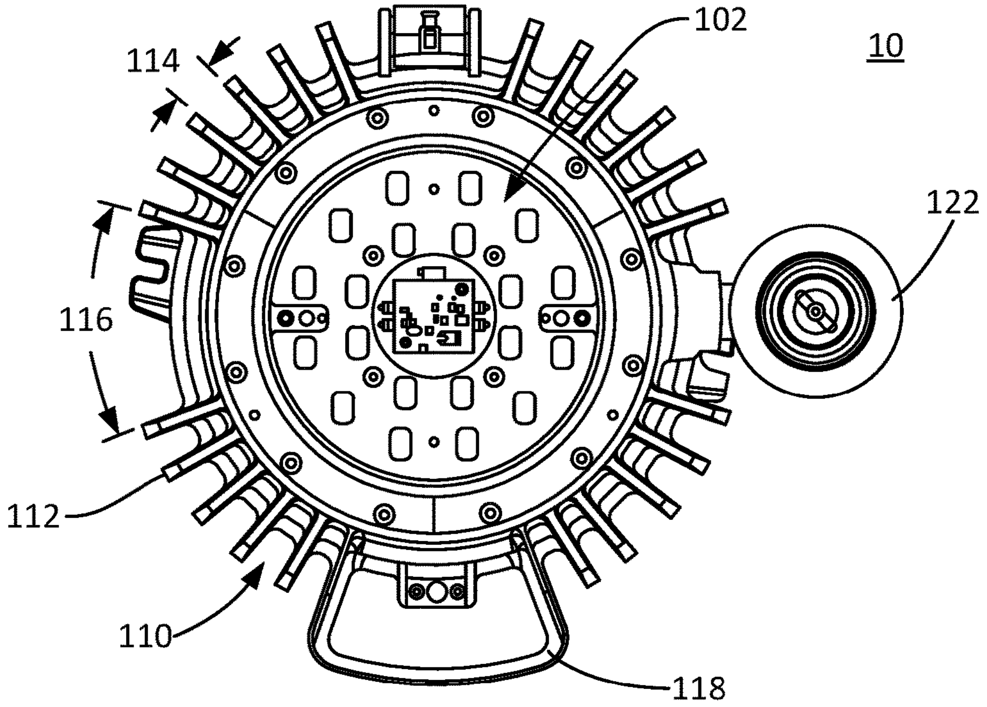
Figure 3:
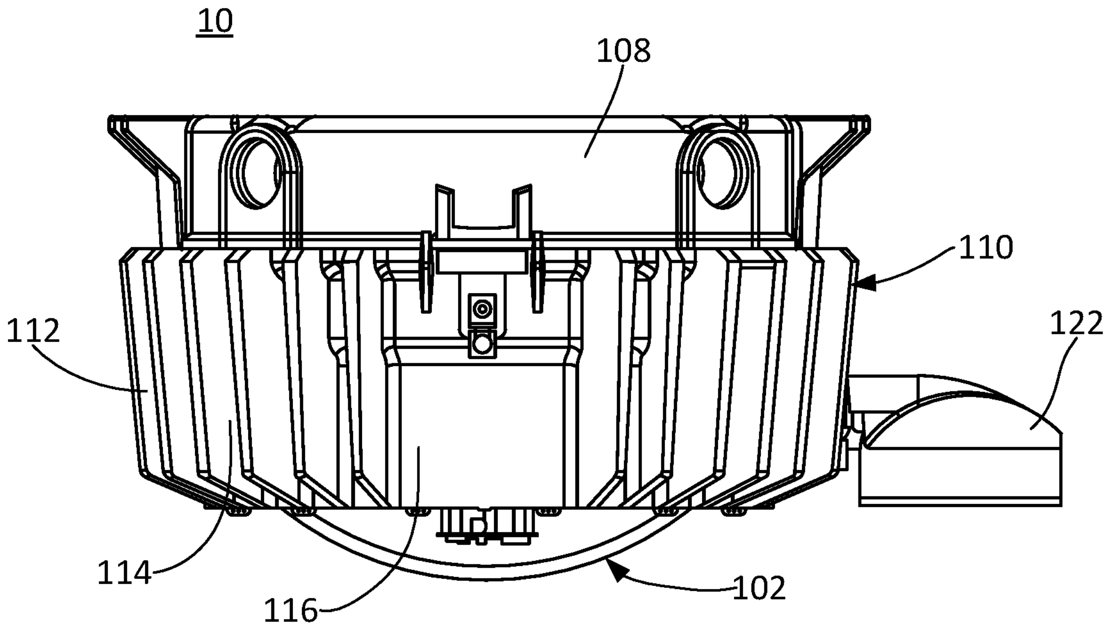
Figure 4:
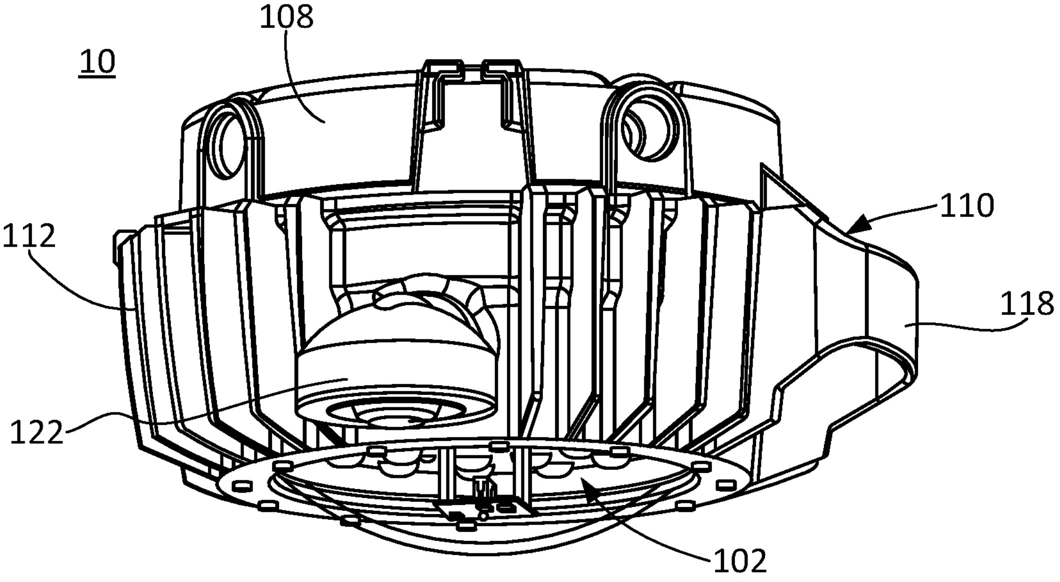
Figure 5:
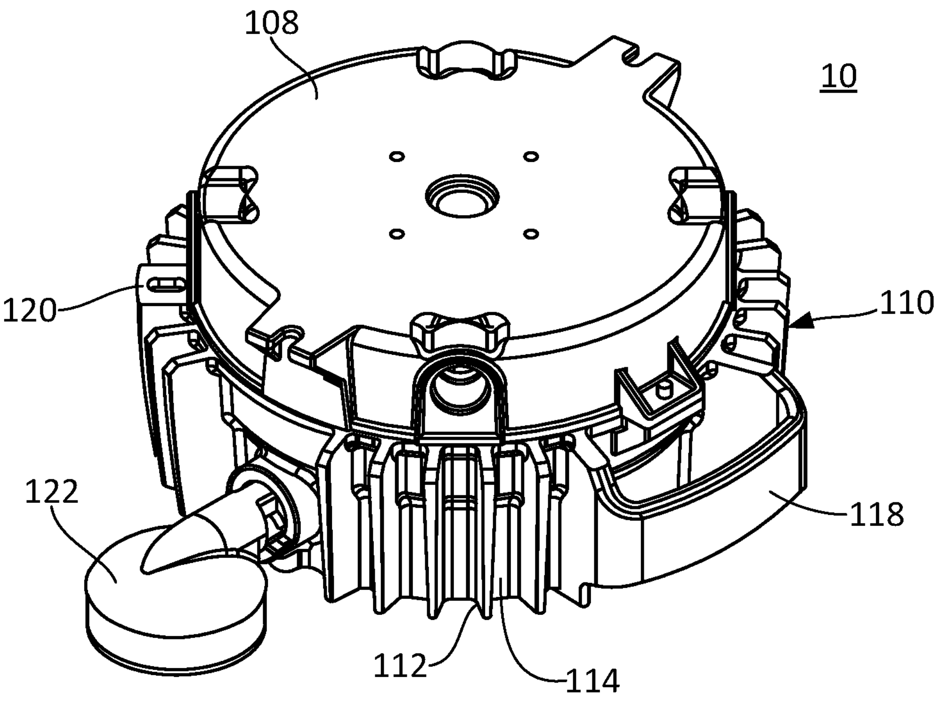

Reference will now be made in detail to the examples which are illustrated in the accompanying drawings. Wherever possible, the same reference numbers will be used throughout the drawings to refer to the same or like parts. Directional references such as "up", "down", "right", and "left" are for ease of reference to the figures and not intended to limit the scope of this disclosure.

Various types of lighting fixtures utilizing LEDs have been developed for numerous types of commercial and industrial environments. More specifically, LED light fixtures have been developed for lighting tasks in harsh and hazardous environments, such as being designed to be explosion-protected. In harsh and hazardous environments, such lighting fixtures are often constructed to be, for example and not by way of limitation, shock-resistant and vibration-resistant with no filament or glass to break, for immediate start with instant full illumination, no lifetime reduction due to switching cycles, and reduced disposal costs. Dealing with heat dissipation requirements or thermal management is a problem area for LED light fixtures. Heat dissipation is difficult in part because high-luminance LED light fixtures typically have numerous LEDs operating at once in relatively small spacing from one another. Further, lighting fixture electronics (e.g., drivers, boards, etc.) are also contained with the lighting fixture and further emit heat. As a result, complex structures for LED module mounting and heat dissipation have, in many instances, been deemed necessary, which in turn adds complexity and cost to the fixtures.

Further, some known LED fixtures use heat sinks that are coupled to the fixtures and engineered to provide a path for heat to travel and remove heat from the fixtures to ensure a longer life, better lumen output, and accurate color temperature. Many of these typical LED lighting fixtures in hazardous environments are high-luminance light fixtures and generate a large amount of heat in use. Dissipating heat for LED light fixtures is typically accomplished with heat sinks that are costly for manufacturing and add system footprint as these heat sinks are stacked on the fixtures.

Luminaire assemblies that operate within hazardous environments further present a risk of explosion via ignition of surrounding gas or vapor, dust, fibers, or the like. Such hazardous environments may arise, for example, in petroleum refineries, petrochemical plants, grain silos, wastewater, treatment facilities, or other industrial facilities, wherein volatile conditions are produced in the ambient environment and present a heightened risk of fire or explosion. An occasional or continuous presence of airborne ignitable gas, ignitable vapors, ignitable dust, or otherwise flammable substances presents substantial concerns regarding safe and reliable operation of such facilities overall, including but not limited to, safe operation of the lighting fixtures within predetermined temperature limits that, if exceeded, could produce ignition sources for possible fire or explosion. As such, any lighting fixtures installed in these hazardous locations must reliably operate at a safe temperature with respect to the surrounding atmosphere. Conventional LED lighting fixtures include extensive heat sink features for dissipating heat, which may considerably complicate the lighting fixture assembly and render the manufacturing cost undesirably high. As a result, there is a need to design the lighting fixture to integrate with the heat sink to optimize the dissipation of heat in the assembly such that the lighting fixture can consistently operate at a safe temperature.

In addition to hazardous locations discussed above, so-called harsh locations also require specific focus in the design of light fixtures used therewith. Harsh locations may entail corrosive elements and the like in the atmosphere that are not necessarily explosive and/or are subject to temperature cycling, pressure cycling, shock and/or mechanical vibration forces that are typically not present in non-harsh operation environments. Of course, some locations in which LED lighting fixtures are desirably employed are both harsh and hazardous by nature, and therefore heavy-duty fixtures are designed to withstand various operating conditions that typical lighting features for other uses could not withstand.

Simpler, more reliable, and more cost-efficient LED luminaire assemblies for harsh and hazardous environments are therefore desired. A further demand is to reduce the weight and/or size of the components, and improve the durability of the lighting fixture in order to reduce the cost of manufacture while making the lighting fixtures more ergonomic for installation, repair, or replacement. Simultaneously, any reduction in size or changes in components must still meet the rigorous demands for harsh and hazardous environments, for example and not by limitation, adequate heat dissipation, corrosion-proof, flame-proof, and the like.

The embodiments disclosed herein present a new LED luminaire assembly that accommodates various lighting components in a single housing with optimized shape and size while meeting the required thermal performance for specific types of harsh and/or hazardous environments. For example, certain embodiments according to this disclosure may offer 30% weight reduction or 35% reduced packaging space. Moreover, components with lower temperature tolerance such as the LED driver may be kept thermally isolated by a unique mounting plate from heat-generating features like the LEDs to ensure proper functioning. Customers may further benefit from the case of mounting in confined spaces, cleaning, servicing, and handling through various novel structures such as a handle, one or more rollover prevention features, streamlined heat dissipation fin designs, and so forth, which will be explained in greater detail below. Other benefits of this disclosure may become apparent to those skilled in the art in light of the description, the figures, and the claims.

FIGS. 1-5 illustrate, from multiple perspectives, an embodiment of a luminaire assembly 10 according to this disclosure. In general, the luminaire assembly 10 may be configured to have a relatively high luminous flux—e.g., in a range from approximately 17,000 lumens (lm) to approximately 25,000 lm or other suitable ranges—and may be rated to be operated in a harsh and hazardous environment as discussed at length above or other industrial and commercial spaces. In particular embodiments, the luminaire assembly 10 may include an integrated housing 110 that accommodates an LED assembly 102, a driver 106, as well as other suitable lighting features. As an example and not by way of limitation, the LED assembly 102 may include multiple LEDs for providing the desired luminous flux and other electronic components such as electronic boards. The driver 106 may be configured to provide electricity to drive the LEDs of the LED assembly 102. In particular embodiments, the integrated housing 110 may comprise one or more elements intended to dissipate heat produced by the luminaire assembly, for example, one or more fins 112, and may be designed for both containing these luminaire components (e.g., the LED assembly 102, the driver 106, and other electrical or electronic components) and performing heat dissipation to meet various thermal requirements. For example, during operation, the LED assembly may heat up quickly—the luminaire assembly may reach a temperature as high as 120° C.—especially when the luminaire assembly is operated in a hazardous environment where ambient temperature may be as high as 55° C., for example. This temperature of the LED assembly is much higher than the operation temperature limit of the driver, e.g., 80° C. To prevent the driver 106 and other electrical components within the luminaire assembly from being overheated, in particular embodiments, the integrated housing 110 may accommodate the LED assembly 102 on one side of a mounting plate 702 and the driver 106 on the other side of the mounting plate 702 to provide separation between the LED assembly 102 and the driver 106 and also improve dissipation of heat. The mounting plate 702, when installed horizontally in the integrated housing (as depicted in, for example, FIGS. 7 and 8) may divide the integrated housing 110 into an upper internal cavity 706 and lower internal cavity 708.

In particular embodiments, the luminaire assembly 10 also includes a driver cover 108 mounted to the integrated housing 110 and configured to cover an interior of the integrated housing 110. For example, the driver cover 108 may cover the driver 106 and other sensitive electronics that are housed inside the integrated housing 110 so as to protect them against the environment and enclose the upper internal cavity 706. For example, the edges of the upper internal cavity 706 may be defined by the inner edges of driver cover 108 and integrated housing 110. Additionally, a seal (not shown) such as an O-ring may be positioned along an interface between the driver cover 108 and the integrated housing 110 such that the luminaire assembly 10 is sealed tight against dust, moisture ingression, etc. Alternatively and in particular embodiments, the driver cover 108 may be coupled to the integrated housing 110 via a hinge, a snap-fit, a clipper, adhesive, or other suitable coupling feature that allows the driver cover 108 to be openable relative to the integrated housing 110, providing access to the interior of the integrated housing 110 to, for example, provide maintenance purposes or repairing or replacing the various components within the upper internal cavity 706 (e.g., the driver 106). In particular embodiments, the driver cover 108 may be provided with one or more mounting features located at a top surface of the driver cover 108 such as mounting holes or the like. For example, fasteners like screws may be inserted through the holes to secure the luminaire assembly 10 to a desired mounting site or surface, for example and not by way of limitation, a wall or ceiling within a harsh and hazardous environment.

In particular embodiments, the integrated housing 110 may comprise one or more fins 112 extending radially outward from the integrated housing 110. The integrated housing 110 may be generally cylindrical and configured to accommodate various electrical and electronic components—e.g., the driver 106—inside the integrated housing 110. In some embodiments, the integrated housing 110 may also house other components such as one or more Internet of Things (IoT) boards that enable communication between, for example and not by way of limitation, the luminaire assembly, control of lighting, smart features, or wireless technologies. An upper rim of the integrated housing 110 may be coupled to the driver cover 108, for example, in a sealed manner as described above, so as to cover the interior of the integrated housing 110. The LED assembly 102 may be attached underneath a bottom of the integrated housing 110 such that the LED assembly 102 is isolated from the driver 106. In particular embodiments, the luminaire assembly 10 also includes a driver cover 108 mounted to the integrated housing 110 and configured to cover an interior of the integrated housing 110. For example, the LED assembly 102 may cover the bottom of the integrated housing 110 to enclose the lower internal cavity 708. For example, the edges of the lower internal cavity 708 may be defined by the inner edges of LED assembly and integrated housing 110.

In particular embodiments, the fins 112 may generally be flat in shape and oriented along the radial direction of the integrated housing 110. As an example and not by way of limitation, the fins 112 may be positioned around the outer circumference of the integrated housing 110 and arranged at one or more predefined spacings from each other. Heat generated by one or more components within the luminaire assembly 10 may be dissipated to air through the spacings, as well as being directed further away from the integrated housing 110 through the fins 112. In particular embodiments, the spacing between adjacent fins 112 may be a through spacing 114, providing an open passage along an axial direction of the integrated housing 110. Specifically, the fins 112 may be designed with no neck or other lateral feature interposing between the fins 112, reducing the cross-sectional area of the luminaire assembly 10 that undesirably collects dust. Conventionally, a heat sink may be designed with complicated fin structures or include rib-like features connecting the fins, which typically extend from the integrated housing and span across the fins circumferentially. This adds complexity to the overall system and makes it difficult for manufacture and maintenance, especially for cleaning, as dust, water, or other particles may accumulate on the heat sink. The embodiments according to this disclosure contrast and improve upon conventional fin designs as it removes the intervening ribs, providing an open spacing between the fins that is easily accessible for cleaning purposes and streamlining the fin design. Configured as such, the fins 112 have the least dust or rain accumulation on the luminaire assembly at the installation site. This allows easy and fast cleaning of the product during maintenance with less amount of effort and water resources.

As further illustrated, in particular embodiments, the spacing between adjacent fins 112 may be a leg spacing 116, providing an open passage along an axial direction of the integrated housing 110. One or more leg spacings 116 may be formed between the fins 112, which separate the adjacent fins 112 at a greater distance (e.g., in a circumferential direction) than the through spacings 114. Similar to the through spacing 114, the leg spacing 116 may extend throughout along the axial direction of the integrated housing 110, e.g., to eliminate any features connecting transversely between the fins 112 that collect dust. In operation, the leg spacing 116 may provide an anti-rollover feature and work as a stand when the luminaire assembly 10 is placed on a flat surface. This reduces or avoids rollover and product falloff. This moreover enhances safety for the operator and avoids damage to the fragile components of the luminaire assembly 10 such as lens, sensor, glass, window, etc. In some embodiments, two leg spacings 116 may be provided, which are separated at 90 degrees apart from each other such that the customer may conveniently place the luminaire assembly 10 in different orientations without the risk of rollover or falloff. In other embodiments, more or less leg spacings 116 may be provided as needed or located differently without departing from the scope of this disclosure.

In particular embodiments, a handle 118 may be formed outside the integrated housing 110, which may be configured as an extension of two or more of the fins 112. As an example and not by way of limitation, the handle 118 may stem from one fin 112 across a leg spacing 116 to another adjacent fin 112 along a circumferential direction. In practice, for example, the handle 118 allows the user to carry the luminaire assembly effortlessly or hook it to a carabiner or other connectors while climbing ladder or elevator prior to installation. In addition to improving the case of handling, by integrating the handle 118 on the integrated housing 110 and connecting between the fins 112, it may also enhance heat dissipation and improve thermal performance as heat generated by the electronic components of the integrated housing 110 may be directed via the handle 118 away from the integrated housing 110 or dissipate to the air in the leg spacing 116 underneath the handle 118. In alternative embodiments, the handle 118 may be comprised of an insulating material, or covered with an insulating material to reduce the temperature of the handle and enable safe handling by workers during installation or maintenance of luminaire assembly 10 in harsh or hazardous environments.

Additionally, in some embodiments, a cable router 120 may be disposed at the outer circumference of the integrated housing 110. For example, the cable router 120 may extend between two fins 112 and includes a hole for looping safety cable therethrough or facilitating attachment of other suitable wiring features or connectors. Moreover, as illustrated, a sensor assembly 122 may be coupled to the integrated housing 110. The sensor assembly 122 may enclose one or more sensors and/or electronics that are configured to detect and measure movement, area occupancy, lighting levels, ambient temperatures, and so forth. It should be understood that while this disclosure describes and illustrates embodiments of the integrated housing 110 as having particular components such as the cable router and the sensor assembly in a particular manner, such a configuration is not necessarily a requirement. Other embodiments of the integrated housing are also envisioned with or without these features, or with various combinations of these features, and do not depart from the scope of this disclosure.

In particular embodiments, the integrated housing 110 may be integrated and manufactured as one single piece. For example, the integrated housing 110 may integrate the aforementioned individual components such as the fins, the handle, the sensor assembly, etc., into one single piece. In particular embodiments, the integrated housing 110 may be fabricated by casting. Alternatively, the integrated housing 110 may be fabricated by other manufacturing processes such as molding, additive manufacturing, or other suitable methods. In particular embodiments, the integrated housing 110 may be composed of aluminum, such as AL 8360, or may be composed of other thermally conductive material such as copper for performing the desired functions as described herein, for example, the heat dissipation and durability requirements for harsh and hazardous environments.

Figure 6:
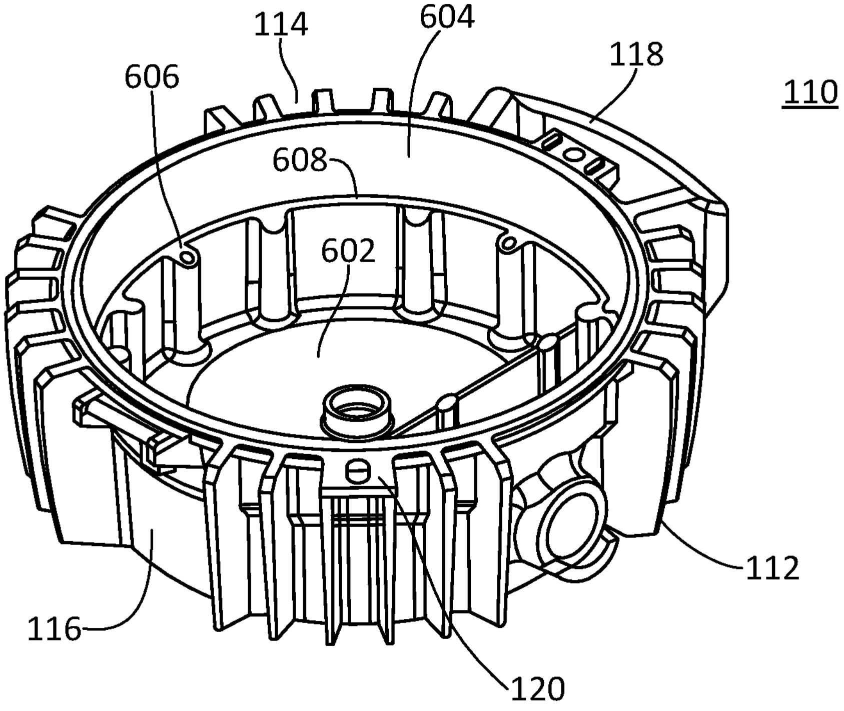
FIG. 6 illustrates a standalone view of an embodiment of an integrated housing of the luminaire assembly of FIGS. 1-5.

FIG. 6 illustrates a top perspective view of the integrated housing 110, with the driver cover 108 removed to better observe the interior and the upper internal cavity 706 of the integrated housing 110. In the depicted embodiments, the integrated housing 110 comprises a wall 604 extending upward from a base plate 602. The base plate 602 may be circular, or in other shapes such as elliptical or rectangular for performing the desired functions of this disclosure. The base plate 602 and the wall 604 may together define a cavity, in which the driver 106 and other internal components may be contained and covered by the driver cover 108. The integrated housing 110 may further include one or more pillars 606 that extend from an inner side of the wall 604. For example, the pillars 606 may extend along the wall 604 in a height or axial direction of the wall 604. Additionally or alternatively, the inner surface of the wall 604 may be designed with a step 608 extending circumferentially. The step 608 may form a platform together with the top surface of the pillars 606, allowing a mounting plate (e.g., a mounting plate 702 of FIG. 7, which will be described further below) to be supported thereon. For example, one or more of the pillars 606 may be drilled with holes for receiving fasteners like screws to secure the mounting plate in place. Alternatively or additionally, other coupling features may also be used for installing the mounting plate within the integrated housing 110, for example, a gasket or adhesive sealant. As another example, an O-ring or other element may be further installed between the step 608 and mounting plate to further seal or isolate the upper internal cavity 706 from the lower internal cavity 708.

In particular embodiments, thickness of the base plate 602 and the wall 604 of the integrated housing 110 may be adjusted depending on the desired temperature reduction and thermal performance of the luminaire assembly 10. For example, a reduced thickness may reduce heat transferred from the integrated housing 110 to the surroundings, while an increased thickness may increase heat transferred from the integrated housing 110 to the surroundings. In particular embodiments, the wall 604 may be straight, tapered, stepped, or otherwise shaped to meet different manufacturing requirements or operation parameters.

Figure 7:
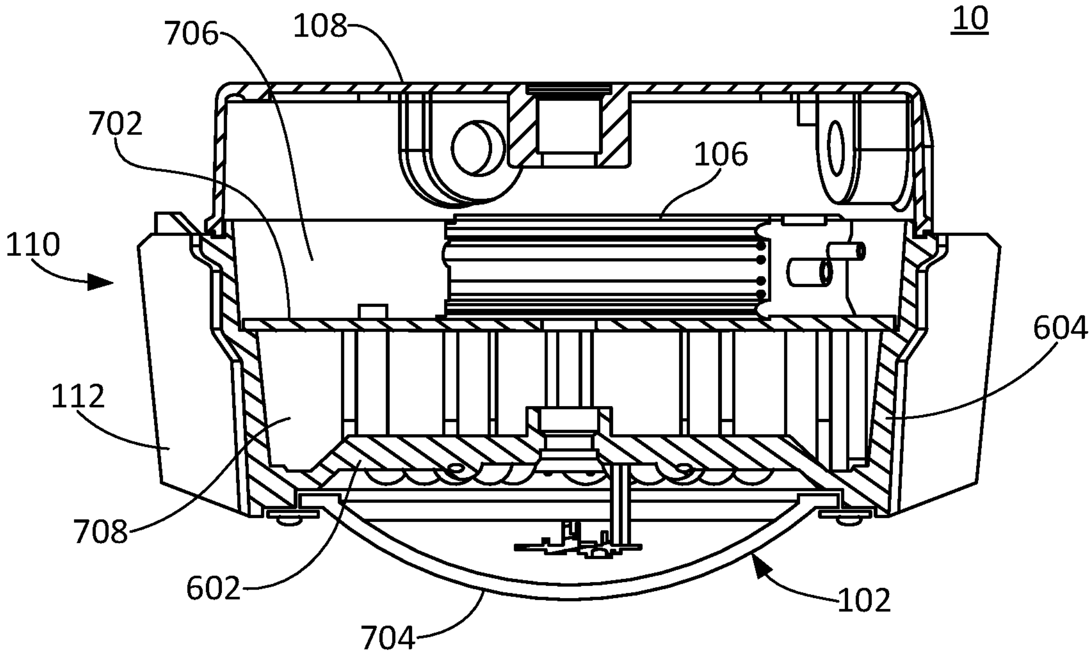
FIGS. 7-9 illustrate multiple cross-sectional views of the luminaire assembly of FIGS. 1-5, specifically showing the interior of the integrated housing with various components mounted in place.
Figure 8:
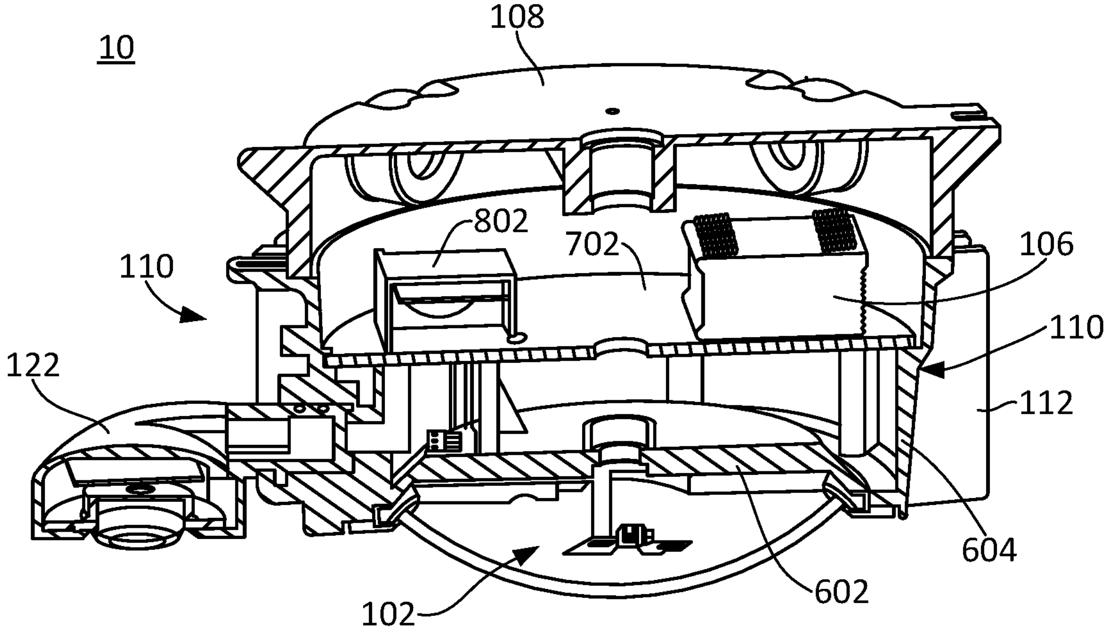

FIGS. 7-8 illustrate different cross sections of the luminaire assembly 10 in particular embodiments. As depicted, in particular embodiments, a mounting plate 702 is mounted horizontally within the integrated housing 110 such that the interior of the integrated housing 110 is divided into an upper and lower internal cavity 706, 708. The driver 106 as well as other components 802 is mounted to an upper surface of the mounting plate 702 within the upper internal cavity 706. For example, the mounting plate 702 may be secured to the pillars 606 via fasteners and fitted to the inner surface of the integrated housing 110 on the step 608 of the wall 604. The LED assembly 102 on the other hand is secured to the underside of the base plate 602 of the integrated housing 110 below the lower internal cavity 708. Although not depicted, other components, for example and not by way of limitation an Internet of Things (IoT) board may be mounted within the lower internal cavity 708. The underside of the base plate 602 may be concave in structure for receiving the LED assembly 102. A lens 704 may be secured to the underside of the base plate 602 via fasteners such as screws and cover the LED assembly 102.

Figure 9:
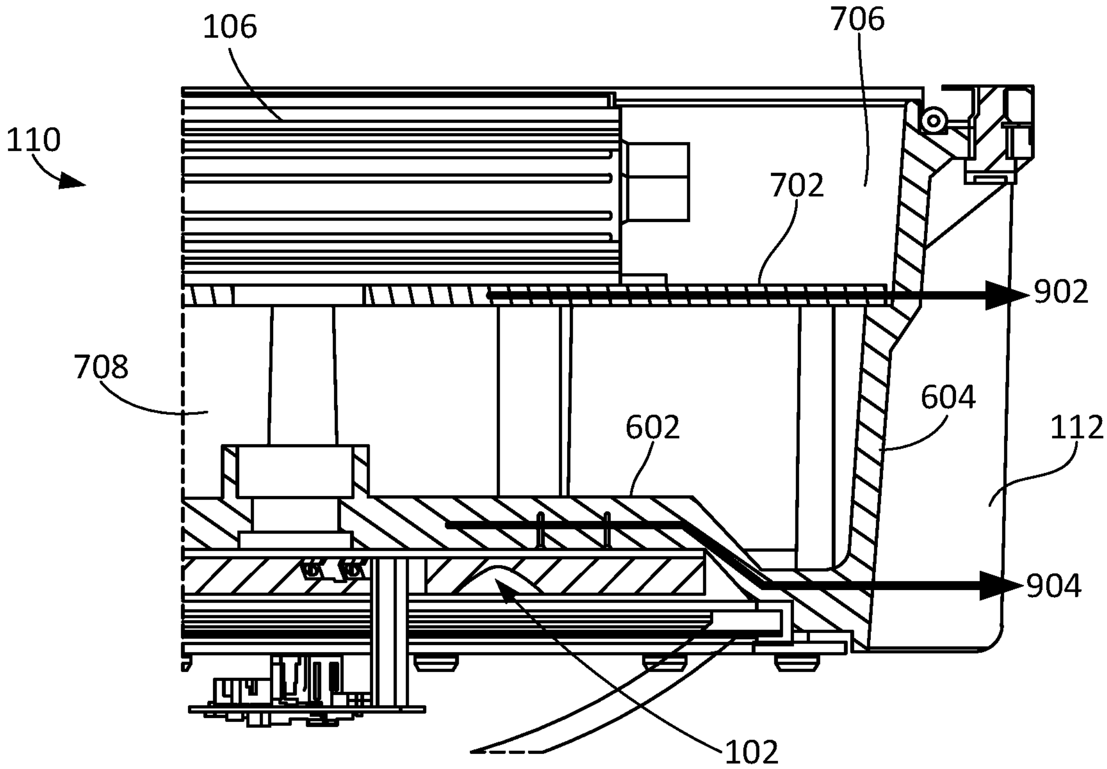
Figure 10A:
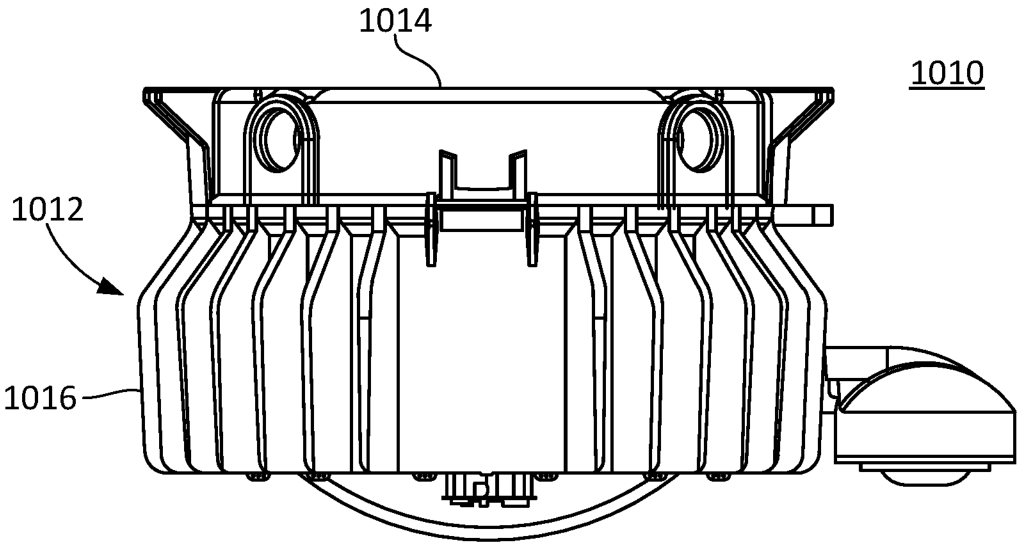
FIGS. 10A-10D illustrate multiple perspective views of another embodiment of a luminaire assembly according to this disclosure.
Figure 10B:
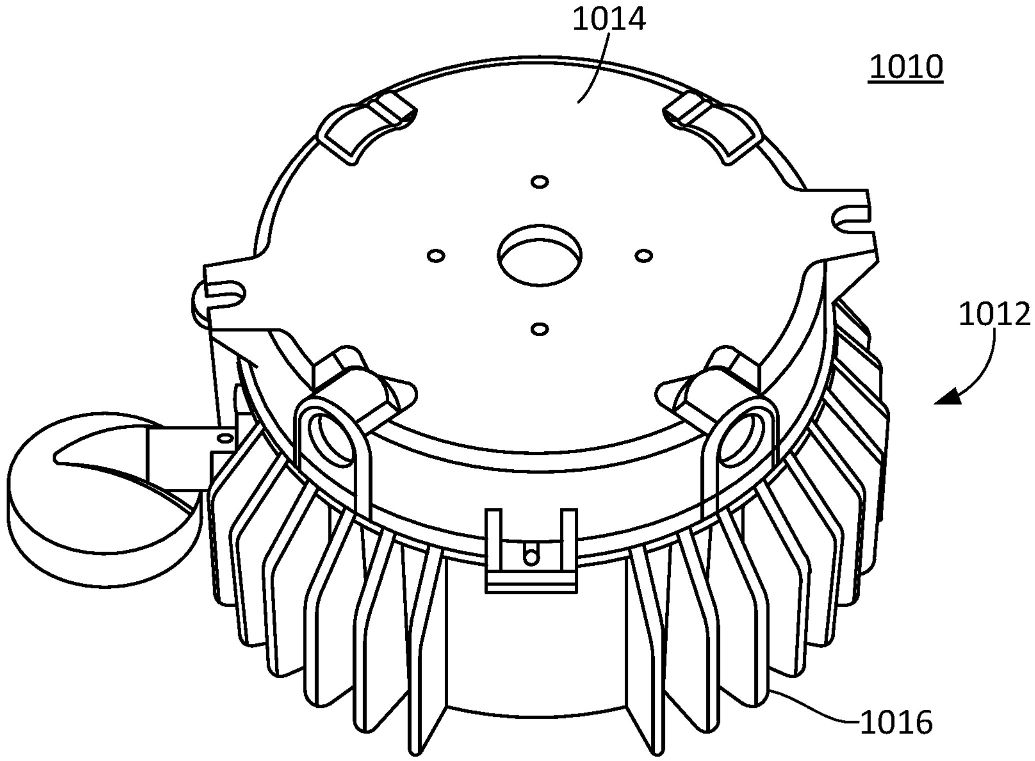
Figure 10C:
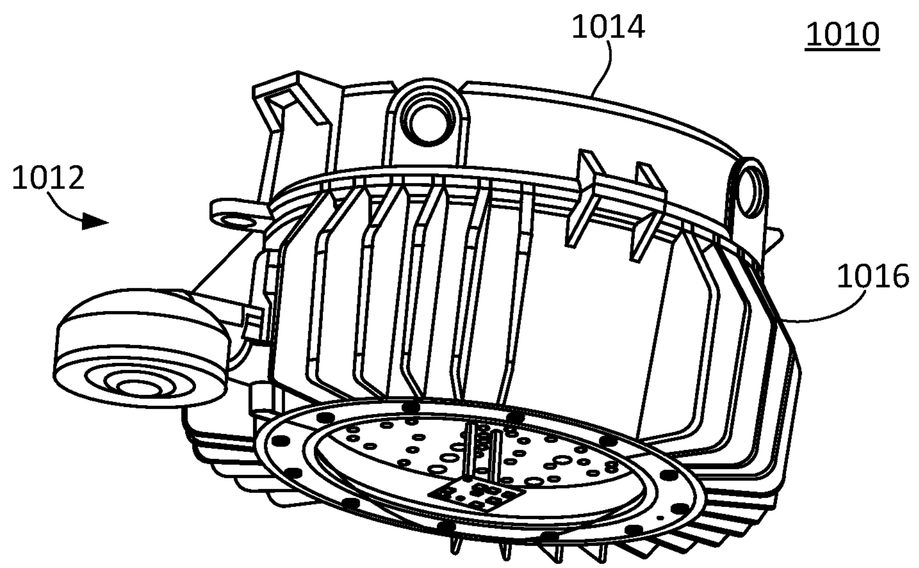
Figure 10D:
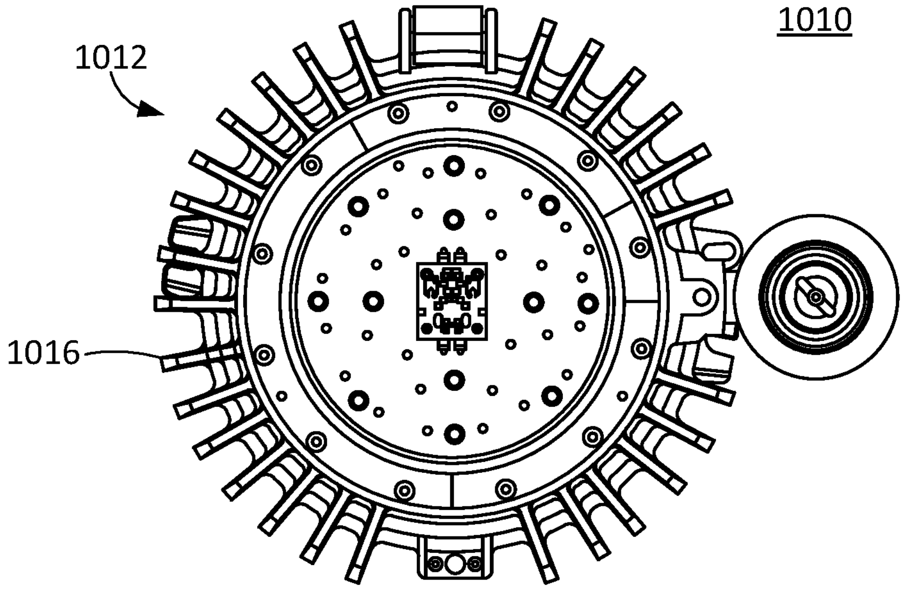
Figure 11A:
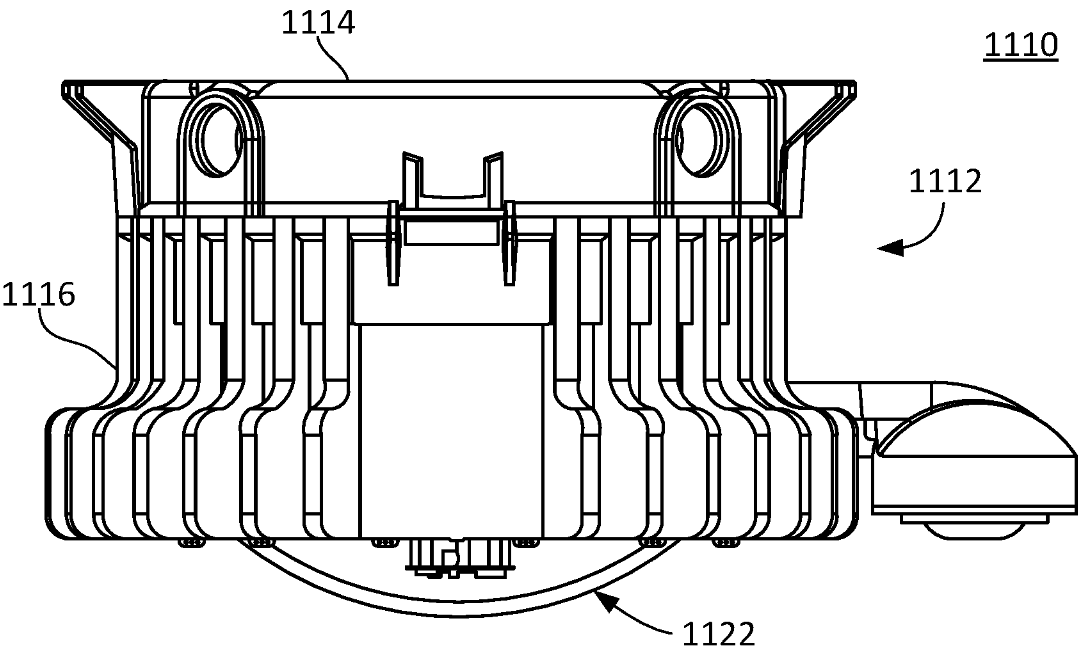
FIGS. 11A-11D illustrate multiple perspective views of a further embodiment of a luminaire assembly according to this disclosure.
Figure 11B:
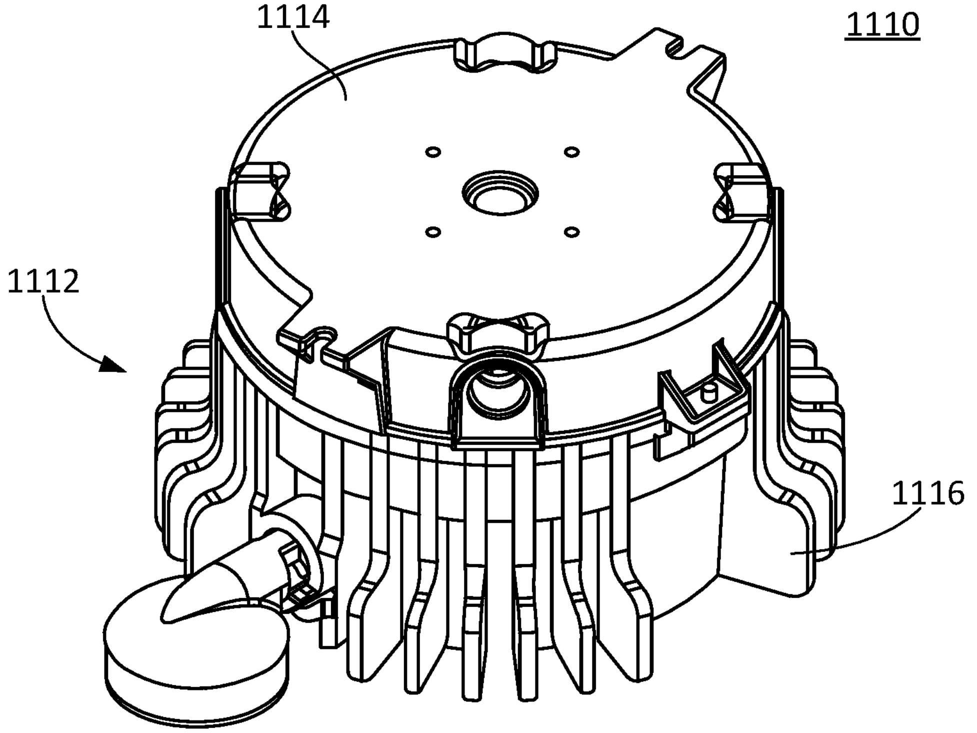
Figure 11C:
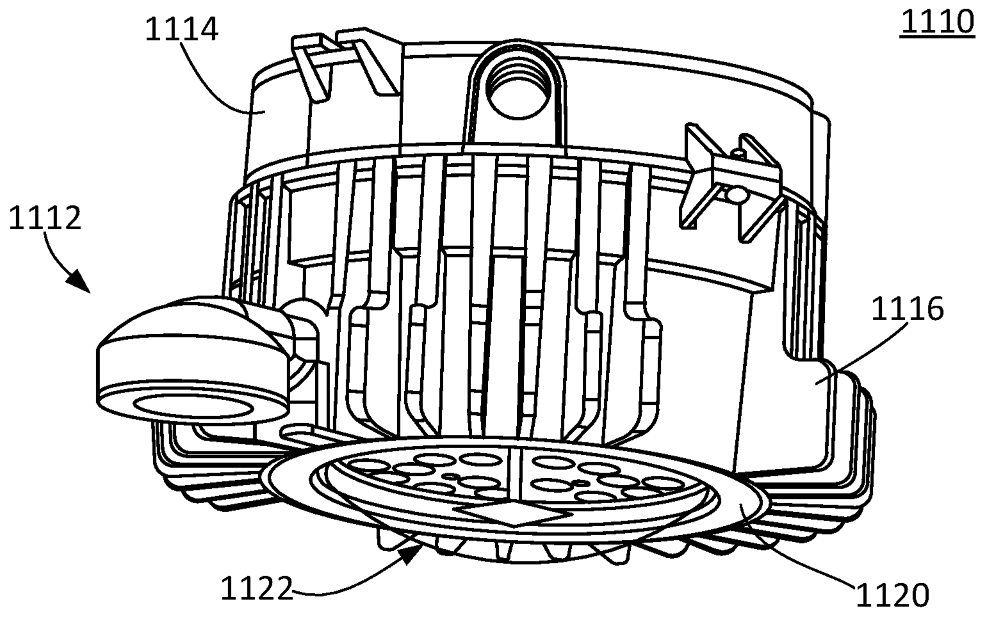
Figure 11D:
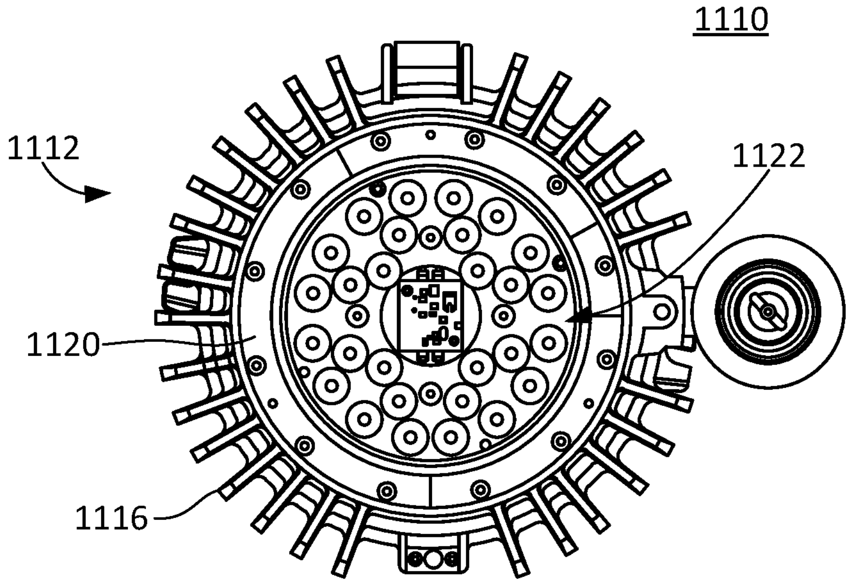
Figure 12A:
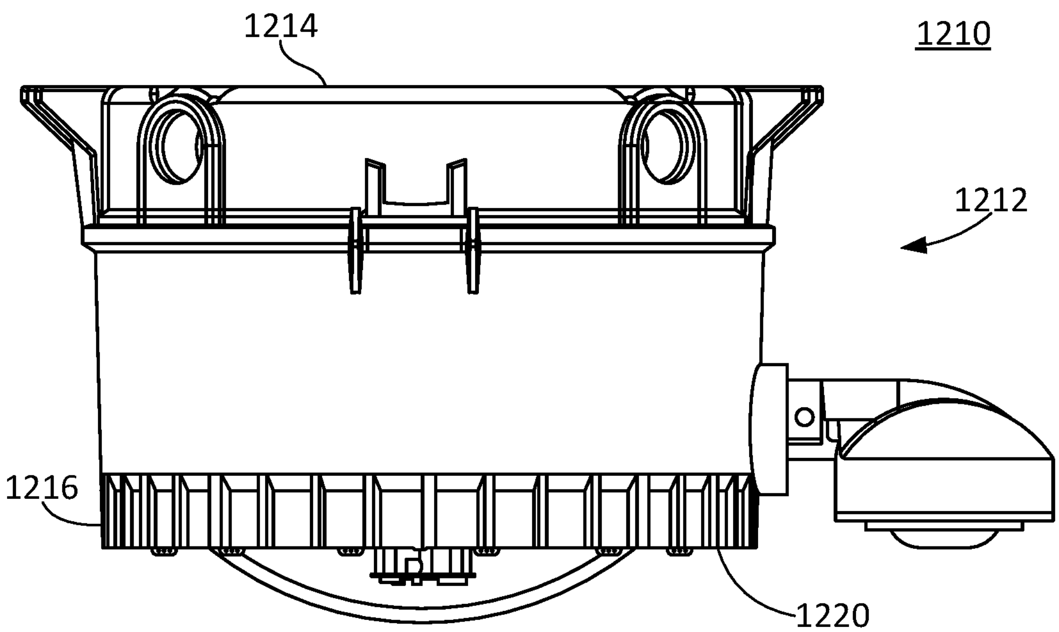
FIGS. 12A-12D illustrate multiple perspective views of another embodiment of a luminaire assembly according to this disclosure.
Figure 12B:
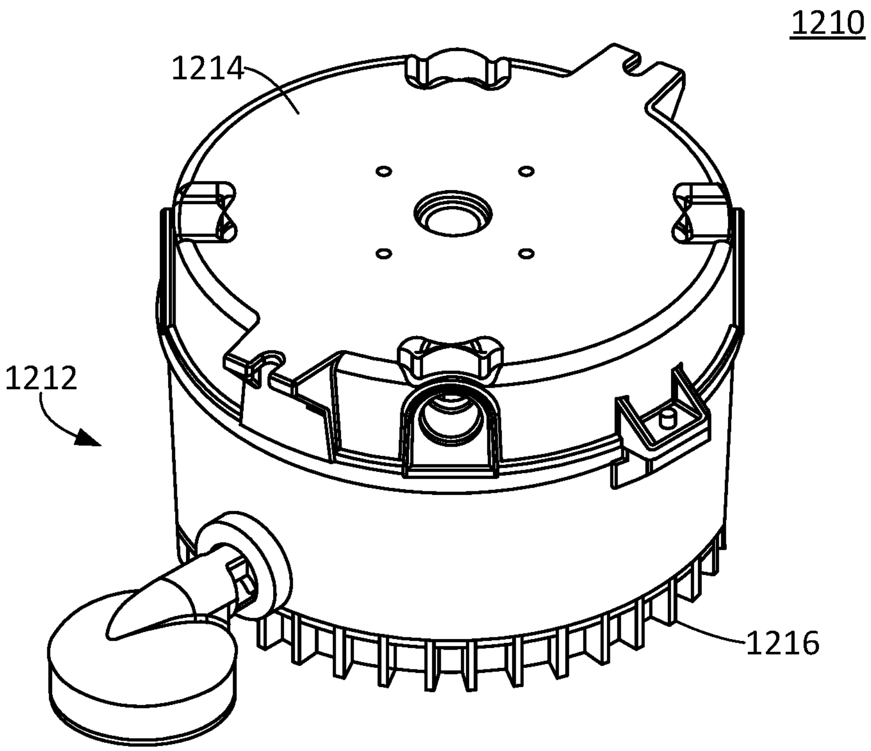
Figure 12C:
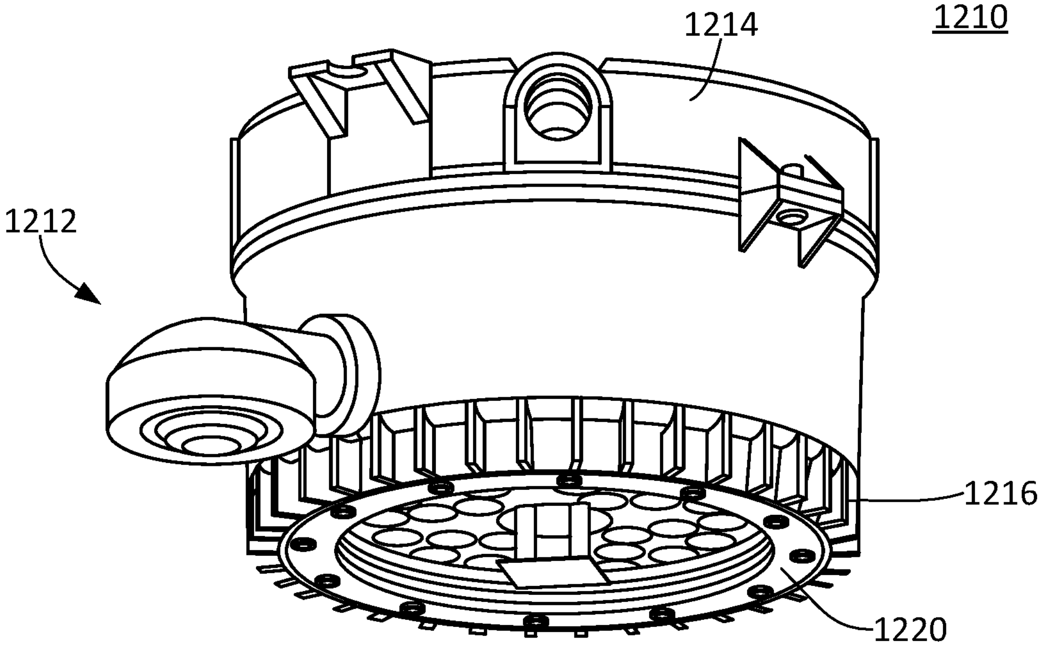
Figure 12D:
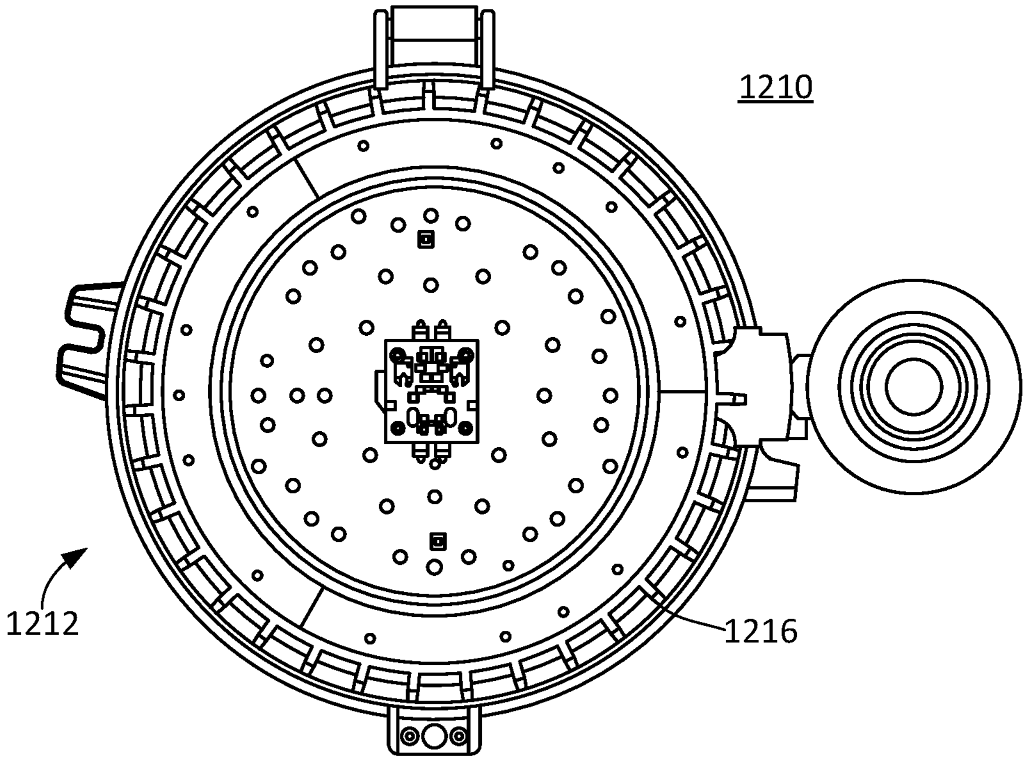

FIG. 9 illustrates heat dissipation flow paths of the luminaire assembly 10 in particular embodiments. By mounting the driver 106 on the mounting plate 702 and separating the mounting plate 702 from the base plate 602 by the lower internal cavity 708, heat isolation may be improved, allowing the driver 106 to operate under a reduced temperature as compared to the temperature of the LED assembly 102. For example, during operation when the ambient temperature is 65° C., the LEDs of the LED assembly 102 may heat up to 90° C. while the driver surface temperature may be kept under its operational limit, e.g., around 80° C., due to improved thermal isolation. In particular embodiments, the mounting plate 702 may be made of thermally conducting metal or alloy such as aluminum, copper, or other suitable materials. This creates a thermal flow path 902 linking from the driver 106 to the wall 604 and further to the fins 112, allowing heat to escape out of the integrated housing 110 and facilitating increased heat dissipation, especially for the components within the upper internal cavity 706. A separate thermal flow path 904 for cooling the LED assembly 102 is created separate from the thermal flow path 902 by the base plate 602. As depicted, heat produced by the LEDs may be conducted by the base plate 602 to the wall 604 and dissipate to the outside via the fins 112. The isolated thermal flow paths 902, 904 improve heat dissipation and allow the system to perform at higher ambient temperatures while still meeting different thermal requirements for various lighting components.

The aforementioned features, components, and designs, when utilized either individually or in combination, contribute to and provide a luminaire assembly according to this disclosure with reduced weight and height. Specifically, for example, the luminaire assembly 10 as described in detail above may have a weight of around 13 lbs. (7 L) and a height of 5 in. Even with the compact size, the luminaire assembly 10 meets thermal requirements for typical harsh and hazardous location use.

FIGS. 10A-12D illustrate other possible embodiments of a luminaire assembly according to this disclosure, which in particular have different fin designs catering to various ambient environments, operation requirements and use conditions. It should be understood that although this disclosure describes and illustrates a luminaire assembly with a particular fin configuration in a particular manner, various embodiments disclosed herein are merely provided for explanation purposes and are not an exhaustive list of all possibilities. The disclosure contemplates luminaire assemblies with any suitable fin configurations in any suitable manner that may or may not be described or illustrated in detail herein.

In the embodiment of FIGS. 10A-10D, a luminaire assembly 1010 is depicted, which is generally similar to the luminaire assembly 10 in that the luminaire assembly 1010 includes an integrated housing 1012 for containing various luminaire components such as a driver and an LED assembly, and a driver cover 1014 coupled to the integrated housing 1012 and covering its interior. Although not depicted in the illustrated embodiment, the luminaire assembly 1010 may in some implementations be provided with a handle or a cable router. Moreover, multiple fins 1016 of the integrated housing 1012 may be shaped differently from the fins 112. As an example and not by way of limitation, the fins 1016 may be trapezoid in shape, with an upper edge slanted downward. This may further prevent dust or water accumulation as they may shed off the slope easily due to gravity. In addition, the number and arrangement of the fins 1016 may be configured differently. For example, there may be more or less fins 1016 around the integrated housing 1012. As another example, the fins 1016 may be separated by larger or smaller spacings and/or provided with more or less anti-rollover features. In particular embodiments, the change in the shape, size, and quantity of fins in the integrated housing may be a function of one or more of weight considerations, heat management requirements for the particular environment, ergonomics, dust management, water management, maintenance considerations, and/or aesthetics. Although not depicted in FIGS. 10A-10D, luminaire assembly may further comprise one or more internal or external components, shapes, and features as the luminaire assembly depicted in FIGS. 1-9.

In the embodiment of FIGS. 11A-11D, a luminaire assembly 1110 is depicted, which is generally similar to the luminaire assembly 10 in that the luminaire assembly 1110 includes an integrated housing 1112 for containing various luminaire components such as a driver and an LED assembly, and a driver cover 1114 coupled to the integrated housing and covering its interior. Although not depicted in the illustrated embodiment, the luminaire assembly 1110 may in some implementations be provided with a handle or a cable router. Moreover, multiple fins 1116 of the integrated housing 1012 may be shaped differently from the fins 112. As an example and not by way of limitation, the fins 1116 may be designed with an increased width (e.g., along a radial direction) near the bottom of the integrated housing 1112 or near the base plate 1120. Configured as such, heat generated by the LED assembly 1122 attached to the base plate 1120 may be rapidly dissipated through the increased thermal flow area provided by the fins 1116, thus further enhancing thermal performance of the luminaire assembly 1110. Additionally or alternatively, the integrated housing 1112 may be configured with an increased height such that the driver (not visible in these figures) is spaced apart from the base plate 1120 at a greater distance. This improves thermal isolation even further, ensuring the driver to operate at a much lower temperature than the LED assembly 1122. The configurations of this embodiment may be especially useful for harsh and hazardous sites where ambient temperature is particularly high, e.g., 65° C. or even higher. Moreover, although shown as having a substantially horizontal upper edge, the fins may alternatively include an upper edge slanted downward similar to the fins 1016, for example, for reducing dust collection. In addition, the number and arrangement of the fins 1116 may be configured differently. For example, there may be more or less fins 1116 around the integrated housing 1112. As another example, the fins 1116 may be separated by larger or smaller spacings and/or provided with more or less anti-rollover features. In particular embodiments, the change in the shape, size, and quantity of fins in the integrated housing may be a function of one or more of weight considerations, heat management requirements for the particular environment, ergonomics, dust management, water management, maintenance considerations, and/or aesthetics. Although not depicted in FIGS. 11A-11D, luminaire assembly may further comprise one or more internal or external components, shapes, and features as the luminaire assembly depicted in FIGS. 1-9.

In the embodiment of FIGS. 12A-12D, a luminaire assembly 1210 is depicted, which is generally similar to the luminaire assembly 10 in that the luminaire assembly 1210 includes an integrated housing 1212 for containing various luminaire components such as a driver and an LED assembly, and a driver cover 1214 coupled to the integrated housing and covering its interior. Although not depicted in the illustrated embodiment, the luminaire assembly 1210 may in some implementations be provided with a handle or a cable router. Moreover, multiple fins 1216 of the integrated housing 1212 may be shaped differently from the fins 112. As an example and not by way of limitation, the fins 1216 may have a significantly shorter axial length compared to the fins 112 and are positioned at the bottom of the integrated housing surrounding the base plate 1220. Radial width of the fins 1216 may also be reduced such that the fins 1216 stay flush with the outer surface of the integrated housing 1212. This simplifies the structure of the product and provides a lighter design variation, making it more cost-efficient for manufacturing. However, since the effective area for dissipating heat out of the LED assembly is decreased, the luminaire assembly 1210 may have inferior thermal performance as compared to other embodiments (for example, the luminaire assembly 10, 1010, and 1110) and is therefore suitable for use in locations where ambient temperature is lower, e.g., around 55° C. or below. Moreover, given the cooler use environment, height of the luminaire assembly 1210 may also be shortened, resulting in a smaller product size that is desirable in operation sites with confined space for installation. In particular embodiments, the change in the shape, size, and quantity of fins in the integrated housing may be a function of one or more of weight considerations, heat management requirements for the particular environment, ergonomics, dust management, water management, maintenance considerations, and/or aesthetics. Although not depicted in FIGS. 12A-12D, luminaire assembly may further comprise one or more internal or external components, shapes, and features as the luminaire assembly depicted in FIGS. 1-9.

Figure 13:
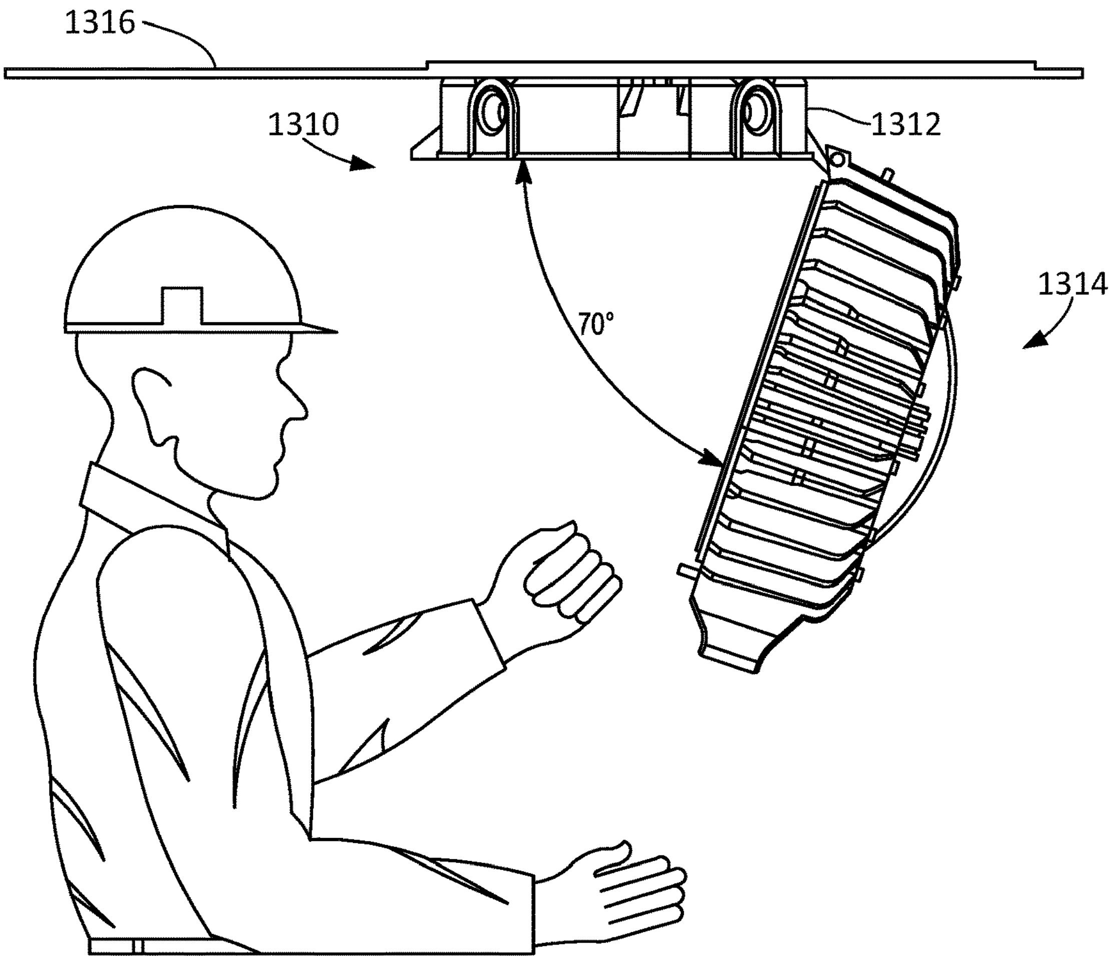
FIGS. 13-14 schematically illustrate the luminaire assembly with the integrated housing opened at different degrees.
Figure 14:
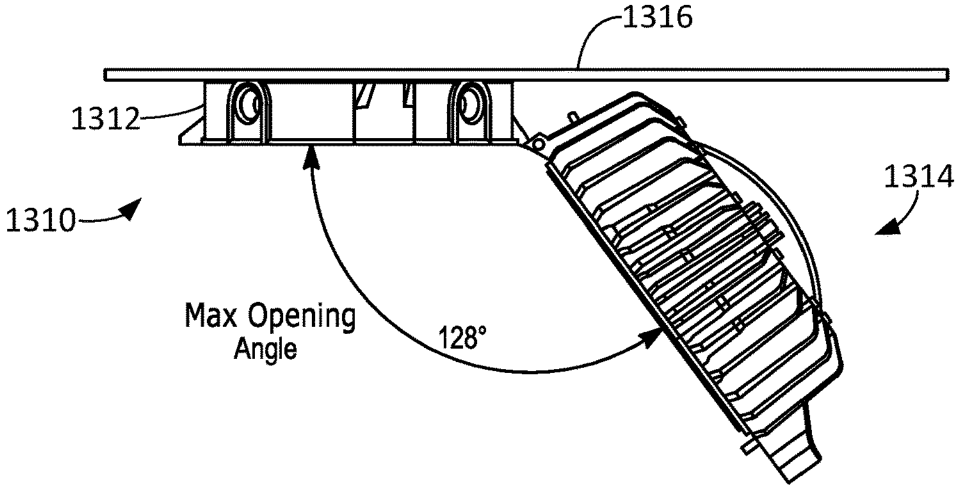

FIGS. 13-14 shows a luminaire assembly 1310 mounted in place, with a driver cover 1312 secured to a ceiling 1316 and an integrated housing 1314 opened relative to the driver cover 1312. For example, by opening the integrated housing 1314, a user may easily access the interior of the integrated housing 1314 to perform maintenance, repair, or replacement of the lighting components located inside the integrated housing 1314 (for example, a driver mounted on a mounting plate). In particular embodiments, a free hang angle of the integrated housing 1314 with respect to the driver cover 1312 may be 70 degrees, although other degrees are also envisioned. For example, as used herein, the free hang angle may be the degree of opening of the integrated housing relative to the driver cover when the integrated housing is unlocked from the driver cover and no force (e.g., apart from gravitational force) is applied to the integrated housing. In particular embodiments, a maximum opening angle of the integrated housing 1314 with respect to the driver cover 1312 may be 128 degrees, although other degrees are also envisioned. Such a design offers more opening for user access thus facilitating case of access, visibility, and servicing of luminaire assembly 1310. In particular embodiments, this improved opening angle may be achieved by the compact luminaire design according to this disclosure, as the height of the luminaire assembly is advantageously reduced, allowing the integrated housing 1314 to open to a greater extent before hitting the ceiling 1316.

Figure 15:
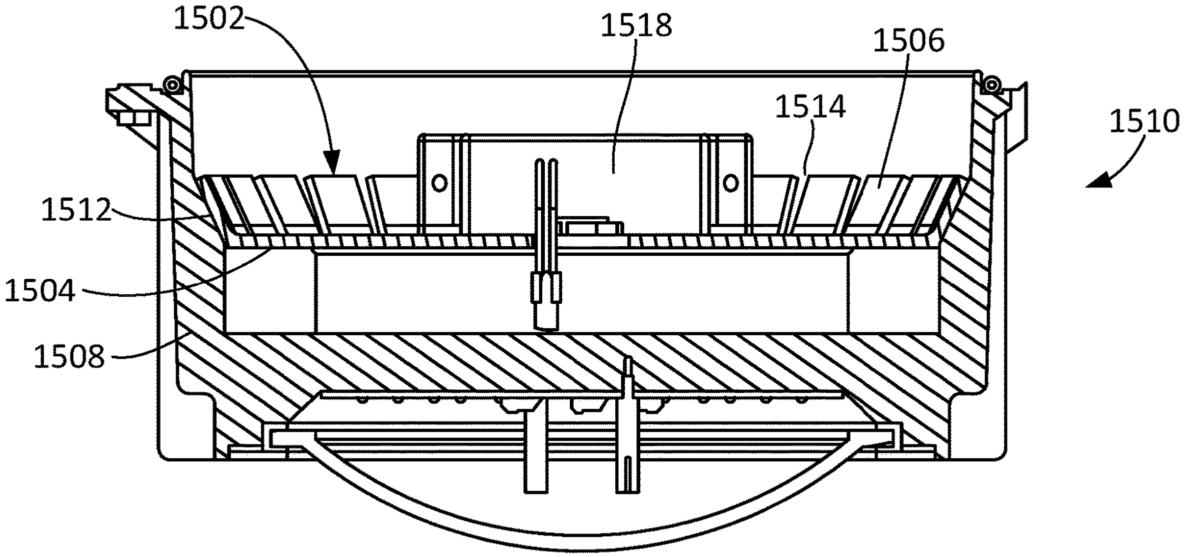
FIGS. 15-19 illustrate various design alternatives of a mounting plate of the luminaire assembly according to this disclosure.
Figure 16:
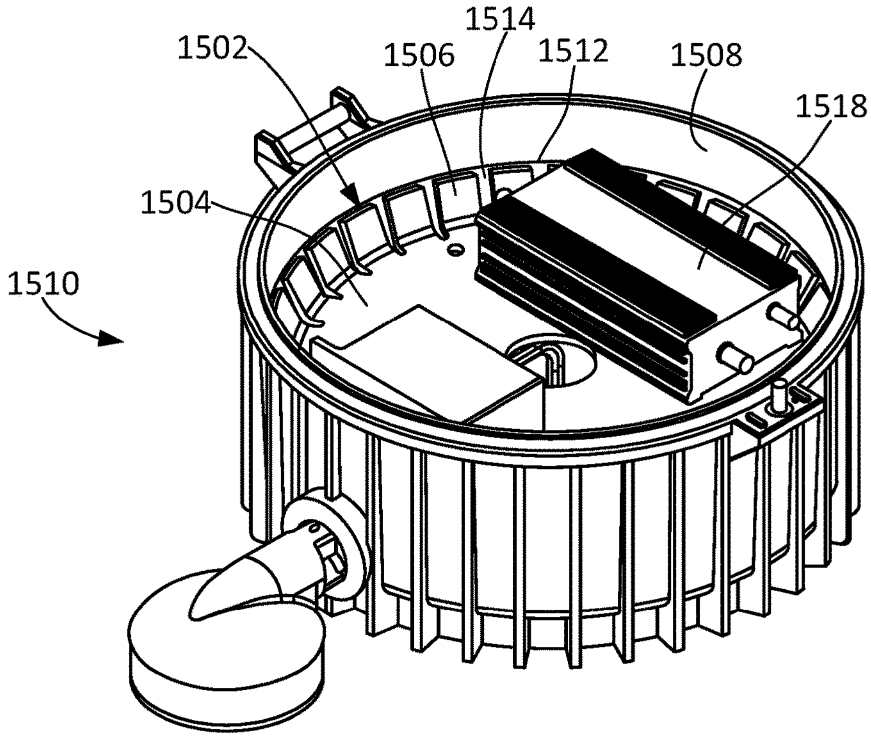
Figure 17:
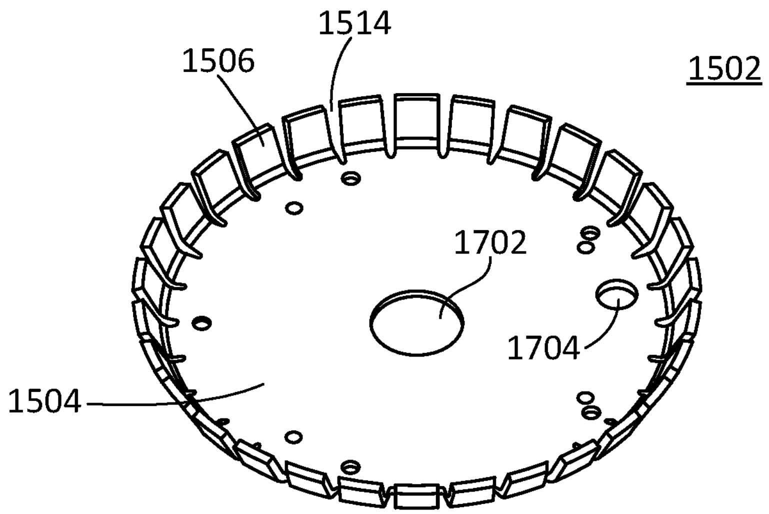
Figure 18:
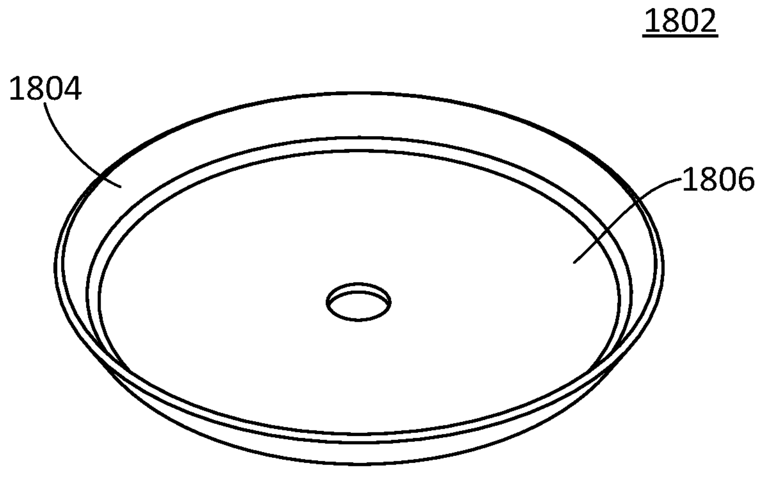
Figure 19:
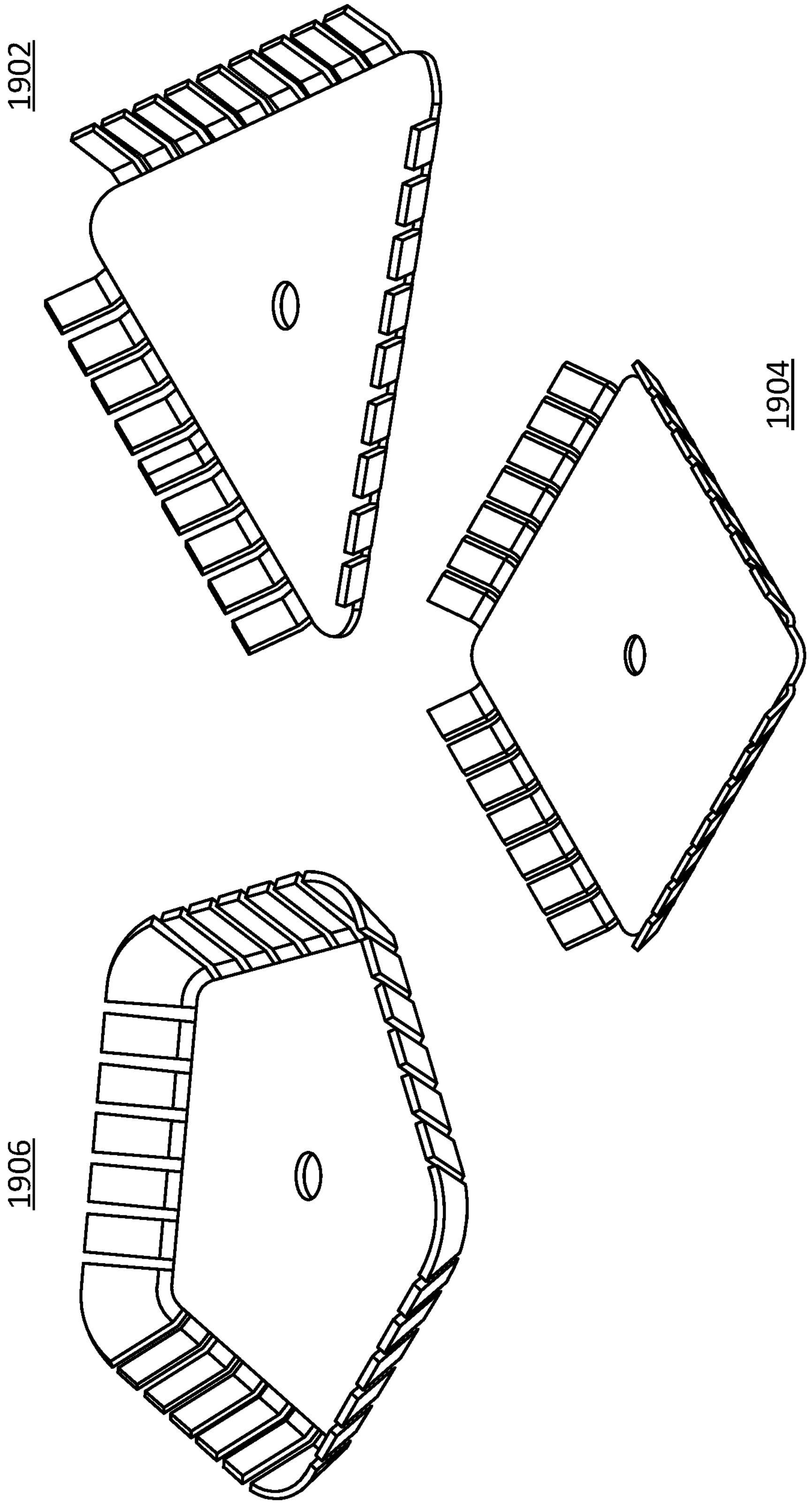

FIGS. 15-17 illustrate another embodiment of a mounting plate according to this disclosure. In FIGS. 15 and 16, the mounting plate is depicted as being installed within the integrated housing. In FIGS. 17-19, the mounting plate is depicted standalone as being removed from the integrated housing. In the illustrated embodiment, the mounting plate 1502 may include a flat base 1504 and a skirt or rim 1506 extending from the flat base 1504. As described herein, the mounting plate 1502 may be made of thermally conductive metal or alloy such as aluminum or copper or other suitable material. The heat generated by the electronic or electrical components (e.g., a driver 1518) mounted on the mounting plate 1502 may be dissipated through the flat base 1504 and the rim 1506 to the surroundings, as depicted in FIG. 9 and described herein. In particular embodiments, the rim 1506 may be orientated at an angle relative to the vertical direction. Correspondingly, the internal wall 1508 of the integrated housing 1510 may be shaped with an angled step 1512 to conform with the rim 1506 so as to fit and support the mounting plate 1502. As an example and not by way of limitation, the rim 1506 may be press fit or force fit to the wall 1508 for coupling the mounting plate 1502 to the integrated housing 1510. Additionally or alternatively, fasteners such as screws, dowels, snap-fits, or the like may be provided to secure the mounting plate 1502 inside the integrated housing 1510. In particular embodiments, the rim 1506 may be configured with multiple cut-outs 1514, which may help maintain maximum contact with the wall 1508 to enhance thermal conductivity. For example, during manufacturing, the mounting plate 1502 may be made of sheet metal that is machined, cast, punched, or otherwise formed with cut-outs 1514. Moreover, the rim 1506 with cut-outs 1514 may be flexible with spring back capability to ensure positive contact of the mounting plate 1502 to the integrated housing 1510. This reduces thermal resistance and allows better conductance. This also helps release stress or strain buildup for example due to rapid heating or cooling cycles. Other benefits may include but are not limited to better adapting the mounting plate 1502 to structural irregularities on the wall 1508 of the integrated housing 1510.

As further illustrated in at least FIGS. 15-19, the mounting plate 1502 may also include a center hole 1702 disposed at the center of the flat base 1504 and one or more mounting holes 1704 arranged in the flat base 1504, e.g., near the circumference thereof. As an example and not by way of limitation, cables, wires, connectors, or other features associated with luminaire components may extend through the center hole 1702 to reach the LED assembly on the other side of the integrated housing, e.g., for providing electric power, data communication, etc. to drive and control the LED assembly as needed. The mounting holes 1704 may be used to receive fasteners such as screws for securing the mounting plate 1502 in place or otherwise be employed for wire routing and the like. Although this disclosure describes a mounting plate with particular features such as various holes in a particular manner, this disclosure contemplates mounting plates with any suitable features in any suitable manner.

FIGS. 18-19 illustrate other design alternatives of a mounting plate according to this disclosure. In the embodiment of FIG. 18, the mounting plate 1802 may be provided with a continuous rim 1804 (i.e., without any cut-outs) that extends from a flat base 1806 and is angled relative to the vertical. In the embodiments of FIG. 19, the mounting plates 1902, 1904, 1906 may be triangular, rectangular or square, polygon, or differently shaped and provided with cut-outs along the rim. Again, it should be understood that, although this disclosure describes and illustrates a luminaire assembly with a particular mounting plate configuration in a particular manner, various embodiments disclosed herein are merely provided for explanation purposes and are not an exhaustive list of all possibilities. The disclosure contemplates luminaire assemblies with any suitable mounting plate configurations in any suitable manner.

Figure 20:
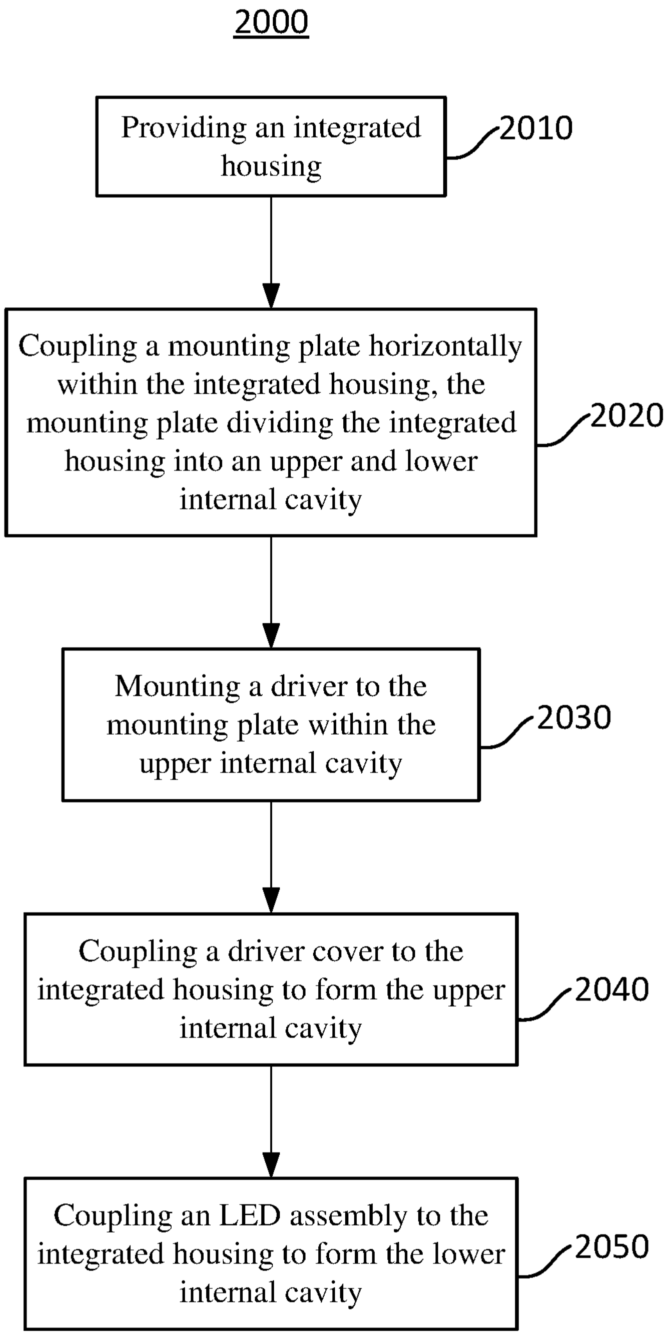
FIG. 20 illustrates a method of manufacturing a light-emitting diode (LED) luminaire assembly according to this disclosure.

FIG. 20 depicts a method for manufacturing a luminaire assembly in accordance with particular embodiments described herein. Method 2000 may be described herein with general reference to FIGS. 6-9 to better explain the invention. It will be appreciated that the embodiments disclosed herein are only examples, and the scope of this disclosure is not limited to them. Particular embodiments may include all, some, or none of the steps or features of the embodiments disclosed below. In addition, details that are familiar to those skilled in the art are not described in exhaustive details.

In particular embodiments, method 2000 may begin at step 2010, where an integrated housing is provided. In a manufacturing process of the luminaire assembly 10 as depicted in FIGS. 6-9, the integrated housing may be structured as the integrated housing 110. As an example and not by way of limitation, the integrated housing 110 includes the base plate 602 and the wall 604 extending upward from the base plate 602. Multiple fins 112 are disposed around the outer surface of the wall 604 and configured for dissipating heat from the integrated housing 110. For example, the fins 112 may be formed integrally with the integrated housing 10 or separately manufactured and assembled as needed. At step 2020, the mounting plate 702 may be coupled within the integrated housing 110 and orientated horizontally. As an example and not by way of limitation, fasteners or other coupling features or methods (e.g., welding, soldering, adhesion, etc.) may be employed to secure the mounting plate 702 in place. For example, the mounting plate 702 may be supported and secured by the pillars 606 (e.g., via screws or the like) or alternatively fitted to the step 608 of the wall 604 (e.g., by form-fit, friction-fit, press-fit, or the like). In particular embodiments, the mounting plate 702 may be spaced at a defined distance from the base plate 602 in a way that divides the integrated housing 110 into the upper internal cavity 706 and the lower internal cavity 708. At step 2030, the driver 106 may be mounted to the mounting plate 702, e.g., on its upper side, within the upper internal cavity 706. Additionally, other luminaire components such as the IoT board may also be mounted to the mounting plate 702. At step 2040, the driver cover 108 may be coupled to the integrated housing 110 to form the upper internal cavity 706. For example, after installation of the electronic and electrical components, the upper internal cavity 706 may be closed off by the driver cover 108. For example, the driver cover 108 may be coupled to the integrated housing 110 along its upper edge by a hinge or other suitable structures. At step 2050, the LED assembly 102 may be coupled to the integrated housing 110 to form the lower internal cavity 708. For example, the LED assembly 102 may be coupled to the underside of the base plate 602 below the lower internal cavity 708. For example, this may be done by securing the LEDs as well as the lens 704 to the lower surface of the base plate 602 via screws or other suitable fasteners. Configured as such, the luminaire assembly according to this disclosure uses a single integrated housing for accommodating all lighting components with compact packaging and optimized thermal performance. It is also easier to manufacture, handle, and service, and offers other operational benefits.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A light-emitting diode (LED) luminaire assembly, comprising:

an integrated housing comprising:

a base plate of the integrated housing, wherein an LED assembly comprising a plurality of LEDs is secured to a first side of the base plate;

a mounting plate that is provided within the integrated housing and divides the integrated housing into a first internal cavity and a second internal cavity;

a driver configured to provide electricity to the LED assembly and mounted to the mounting plate, wherein the driver is positioned on a first surface of the mounting plate within the first internal cavity, and wherein the mounting plate is separated from the base plate by the second internal cavity to improve heat isolation; and a plurality of fins extending radially outward from the integrated housing, wherein heat from the driver is dissipated through the mounting plate and the plurality of fins;

a driver cover, wherein the driver cover is coupled to the integrated housing to form the first internal cavity; and the LED assembly comprising the plurality of LEDs, wherein the LED assembly is coupled to the integrated housing to form the second internal cavity.

2. The LED luminaire assembly of claim 1, wherein the integrated housing further comprises a handle.

3. The LED luminaire assembly of claim 2, wherein the handle extends from two or more fins of the plurality of fins.

4. The LED luminaire assembly of claim 1, wherein two or more of the plurality of fins are separated from one another by a through spacing.

5. The LED luminaire assembly of claim 4, wherein two or more of the plurality of fins are separated from one another by a leg spacing to provide an anti-rollover feature, the separation of the fins in the leg spacing being greater than the separation of the fins in the through spacing.

6. The LED luminaire assembly of claim 5, wherein the integrated housing comprises two anti-rollover features that are positioned 90 degrees apart from each other.

7. The LED luminaire assembly of claim 1, wherein the mounting plate is made of heat-conducting material.

8. The LED luminaire assembly of claim 1, wherein the mounting plate has a rim configured with a plurality of cut-outs.

9. The LED luminaire assembly of claim 1, wherein the driver cover is coupled to the integrated housing via a hinge.

10. The LED luminaire assembly of claim 9, wherein a maximum opening angle of the driver cover relative to the integrated housing is 128 degrees.

11. The LED luminaire assembly of claim 1, wherein heat from the LED assembly is dissipated through the plurality of fins.

12. The LED luminaire assembly of claim 1, wherein the integrated housing further comprises an occupancy sensor.

13. The LED luminaire assembly of claim 1, further comprising one or more Internet of Things (IoT) boards mounted within the second internal cavity of the integrated housing.

14. The LED luminaire assembly of claim 1, wherein an inner surface of the integrated housing comprises a step for coupling the mounting plate to the integrated housing.

15. An integrated housing for use with a light-emitting diode (LED) luminaire assembly, the integrated housing comprising:

a base plate of the integrated housing, wherein an LED assembly comprising a plurality of LEDs is secured to a first side of the base plate;

a mounting plate that is provided within the integrated housing and divides the integrated housing into a first internal cavity and a second internal cavity;

a driver configured to provide electricity to the LED assembly and mounted to the mounting plate, wherein the driver is positioned on a first surface of the mounting plate within the first internal cavity, and wherein the mounting plate is separated from the base plate by the second internal cavity to improve heat isolation; and a plurality of fins extending radially outward from the integrated housing, wherein heat from the driver is dissipated through the mounting plate and the plurality of fins.

16. The integrated housing of claim 15, wherein the integrated housing further comprises a handle.

17. The integrated housing of claim 16, wherein the handle extends from two or more fins of the plurality of fins.

18. The integrated housing of claim 15, wherein two or more of the plurality of fins are separated from one another by a through spacing.

19. The integrated housing of claim 18, wherein two or more of the plurality of fins are separated from one another by a leg spacing to provide an anti-rollover feature, the separation of the fins in the leg spacing being greater than the separation of the fins in the through spacing.

* * * * *